(12) United States Patent
Taniguchi

(10) Patent No.: US 10,520,771 B2
(45) Date of Patent: Dec. 31, 2019

(54) LIQUID CRYSTAL DEVICE, ELECTRONIC APPARATUS, METHOD FOR MANUFACTURING LIQUID CRYSTAL DEVICE, MOTHER SUBSTRATE FOR LIQUID CYSTAL DEVICE, AND METHOD FOR MANUFACTURING MOTHER SUBSTRATE FOR LIQUID CRYSTAL DEVICE

(71) Applicant: SEIKO EPSON CORPORATION, Tokyo (JP)

(72) Inventor: Yoshio Taniguchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 158 days.

(21) Appl. No.: 15/830,451

(22) Filed: Dec. 4, 2017

(65) Prior Publication Data

US 2018/0157069 A1 Jun. 7, 2018

(30) Foreign Application Priority Data

Dec. 5, 2016 (JP) ................. 2016-235639

(51) Int. Cl.
*G02F 1/1337* (2006.01)
*G02F 1/1339* (2006.01)
*G02F 1/1333* (2006.01)
*G03B 21/00* (2006.01)

(52) U.S. Cl.
CPC .......... *G02F 1/1337* (2013.01); *G02F 1/1339* (2013.01); *G02F 1/133351* (2013.01); *G02F 2202/02* (2013.01); *G02F 2202/28* (2013.01); *G03B 21/006* (2013.01)

(58) Field of Classification Search
CPC . G02F 1/1337; G02F 1/133351; G02F 1/1339
See application file for complete search history.

(56) References Cited

U.S. PATENT DOCUMENTS

| 4,759,614 A | * | 7/1988 | Yokokura | ......... G02F 1/133345 349/134 |
| 6,350,874 B1 | | 2/2002 | Ogawa | |
| 7,378,157 B2 | * | 5/2008 | Sakakura | ............... H05B 33/04 428/451 |

(Continued)

FOREIGN PATENT DOCUMENTS

| JP | 2000-344776 A | 12/2000 |
| JP | 2002-148596 A | 5/2002 |
| JP | 2002-148597 A | 5/2002 |

(Continued)

*Primary Examiner* — Lucy P Chien
(74) *Attorney, Agent, or Firm* — Oliff PLC

(57) ABSTRACT

A liquid crystal device includes an elemental substrate provided with a silicon oxide alignment layer on the front surface side thereof. Silanol groups of the alignment layer are bound to an organic silane polymer layer by silane coupling treatment. The silane coupling treatment also forms an organic silane polymer layer on the rear surface side of the elemental substrate. This organic silane polymer layer is a layer having a higher hydrophilicity than the organic silane polymer layer. A light-transmitting plate bonded to the rear surface side of elemental substrate with an adhesive layer is thus unlikely to separate.

18 Claims, 15 Drawing Sheets

(56) References Cited

U.S. PATENT DOCUMENTS

2004/0126712 A1* 7/2004 Kawamura .......... C08F 292/00
430/322
2007/0002235 A1 1/2007 Tanaka et al.

FOREIGN PATENT DOCUMENTS

| JP | 2004-296424 A | 10/2004 |
| JP | 2007-011226 A | 1/2007 |
| JP | 2010-078971 A | 4/2010 |

* cited by examiner

LIQUID CRYSTAL DEVICE, ELECTRONIC APPARATUS, METHOD FOR MANUFACTURING LIQUID CRYSTAL DEVICE, MOTHER SUBSTRATE FOR LIQUID CYSTAL DEVICE, AND METHOD FOR MANUFACTURING MOTHER SUBSTRATE FOR LIQUID CRYSTAL DEVICE

BACKGROUND

1. Technical Field

The present invention relates to a liquid crystal device including an alignment layer stabilized by a silane coupling agent, an electronic apparatus including the liquid crystal device, a method for manufacturing the liquid crystal device, a mother substrate for the liquid crystal device, and a method for manufacturing the mother substrate.

2. Related Art

A liquid crystal device includes a first substrate, a second substrate opposing the first substrate, a frame-like sealing member disposed along the sides of the first substrate to surround a display region, and a liquid crystal layer between the first substrate and the second substrate. If one of the two opposing surfaces of the first substrate is provided with an inorganic alignment layer such as a silicon oxide layer, the alignment layer is likely to have dangling bonds of silicon atoms or dimer structures (Si—Si bonds) formed with silicon atoms at the surface thereof. The dangling bonds reacts with water in the liquid crystal or the atmosphere to form silanol groups (—Si—OH), thus being terminated. Unfortunately, the silanol group is reactive. If the liquid crystal device is used, for example, as a light valve of a projection display apparatus or the like, the liquid crystal device is irradiated with strong light, inducing a photochemical reaction of the silanol groups with the liquid crystal. Repeated photochemical reactions reduce the alignment regulation force of the inorganic alignment layer on the liquid crystal molecules.

JP-A-2007-11226 discloses a technique of treating the surface of the alignment layer with a silane coupling agent so that the hydroxy site (—OH) of the silanol group reacts with an organic silane polymer layer. This technique can prevent the silanol group from photochemically reacting with the liquid crystal.

Unfortunately, when the alignment layer formed at one of the opposing surfaces of the first substrate is treated with a silane coupling agent, the organic silane polymer layer is formed on both the surfaces of the first substrate. It is difficult to prevent the other surface from coming into contact with the silane coupling agent. The molecule of the organic silane polymer layer has a water-repellent organic functional group, such as dodecyl. Accordingly, the organic silane polymer layer has a water repellency so as to form a contact angle of about 90° with water. When a light-transmitting plate (dustproof glass plate) is bonded to the surface of the first substrate opposite the liquid crystal layer with an adhesive layer, the light-transmitting plate is likely to separate at the interface between the organic silane polymer layer and the adhesive layer.

SUMMARY

An advantage of some aspects of the invention is that it provides a liquid crystal device in which a light-transmitting plate bonded to one of the surfaces of a substrate is prevented from separating even though an alignment layer at the other surface is stabilized by a silane coupling agent, and also provides an electronic apparatus including the liquid crystal device, a method for manufacturing the liquid crystal device, a mother substrate for the liquid crystal device, and a method for manufacturing the mother substrate.

According to an aspect of the invention, there is provided a liquid crystal device including a first substrate, a second substrate opposing the first substrate, a frame-like sealing member surrounding a display region and bonding the first substrate and the second substrate together, and a liquid crystal layer between the first substrate and the second substrate. The first substrate includes a first substrate body having a first surface opposing the second substrate and a second surface opposite the first surface. The first surface is provided with a first inorganic alignment layer and a first organic silane polymer layer that are formed in this order, and the second surface is provided with a second organic silane polymer layer being the same as the first organic silane polymer layer, a first adhesive layer, and a first light-transmitting plate that are formed in this order. The portion of the second organic silane polymer layer in contact with the first adhesive layer outside the display region is at least partially modified into a first layer having a higher hydrophilicity than the second organic silane polymer layer.

The first alignment layer at the first surface is an inorganic film such as a silicon oxide film. Accordingly, reactive groups such as silanol groups (—Si—OH) are formed at the surface of the alignment layer by a reaction between Si atoms or the like of the inorganic film and water in the liquid crystal layer or the atmosphere. The reactive groups such as silanol groups are bound to the first organic silane polymer layer made of a product of a condensation of a silane coupling agent. Thus, the reactive groups such as silanol groups are prevented from photochemically reacting with the liquid crystal layer. When the first organic silane polymer layer is formed, the same organic silane polymer layer (second organic silane polymer layer) is formed over the second surface opposite the first surface. The portion of the second organic silane polymer layer in contact with the first adhesive layer outside the display region is at least partially modified into a first layer having a higher hydrophilicity than the second organic silane polymer layer. Accordingly, separation does not occur easily at the interface between the second organic silane polymer layer and the first adhesive layer. The first light-transmitting plate is thus prevented from separating from the first substrate.

The first layer may have a molecular structure in which at least part of a hydrophobic functional group of the second organic silane polymer layer is removed.

The entirety of the portion of the second organic silane polymer layer outside the display region may be modified into the first layer.

At least two portions of the second organic silane polymer layer in contact with the first adhesive layer outside the display region, separated by the display region may be modified into the first layer.

The second substrate may include a substrate body having a third surface opposing the first substrate and a fourth surface opposite the third surface. The third surface may be provided with a second inorganic alignment layer and a third organic silane polymer layer that are formed in this order, and the fourth surface may be provided with a fourth organic silane polymer layer being the same as the third organic silane polymer layer, a second adhesive layer, and a second light-transmitting plate that are formed in this order. The portion of the fourth organic silane polymer layer in contact with the second adhesive layer outside the display region is at least partially modified into a second layer having a higher hydrophilicity than the fourth organic silane polymer layer. Accordingly, separation does not easily occur at the interface between the fourth organic silane polymer layer and the second adhesive layer. The second light-transmitting plate is thus prevented from separating from the second substrate.

The portion of the first organic silane polymer layer in contact with the sealing member may be at least partially modified into a third layer having a higher hydrophilicity than the first organic silane polymer layer. In this instance, the adhesion between the sealing member and the first substrate can be enhanced, preventing moisture penetration or the like.

The liquid crystal device can be used in a variety of electronic apparatuses. An electronic apparatus that is a projection display device includes the liquid crystal device, a light source unit that emits light to be applied to the liquid crystal device, and a projection optical system that projects light modulated by the liquid crystal device. The light emitted from the light source unit is applied to the liquid crystal device through the first substrate.

According to another aspect of the invention, there is provided a method for manufacturing a liquid crystal device including a first substrate, a second substrate opposing the first substrate, a frame-like sealing member surrounding a display region and bonding the first substrate and the second substrate together, and a liquid crystal layer between the first substrate and the second substrate. The method includes: forming a first inorganic alignment layer over a first surface of a first substrate body and then treating the first substrate body with a silane coupling agent, thereby simultaneously forming a first organic silane polymer layer at the first surface and a second organic silane polymer layer at a second surface opposite the first surface; modifying at least a part of the portion of the second organic silane polymer layer outside the display region into a first layer having a higher hydrophilicity than the second organic silane polymer layer; and bonding a first light-transmitting plate with a first adhesive layer in contact with a region including the first layer.

The first alignment layer at the first surface is an inorganic film such as a silicon oxide film. Accordingly, reactive groups such as silanol groups (—Si—OH) are formed at the surface of the alignment layer by a reaction between the metal atoms such as Si atoms of the inorganic film and water in the liquid crystal layer or the atmosphere. The reactive groups such as silanol groups are bound to the first organic silane polymer layer made of a product of a condensation of a silane coupling agent. Thus, the reactive groups such as silanol groups are prevented from photochemically reacting with the liquid crystal layer. When the first organic silane polymer layer is formed, the same organic silane polymer layer (second organic silane polymer layer) is formed over the second surface opposite the first surface. The portion of the second organic silane polymer layer in contact with the first adhesive layer outside the display region is at least partially modified into a first layer having a higher hydrophilicity than the second organic silane polymer layer. Accordingly, separation does not occur easily at the interface between the second organic silane polymer layer and the first adhesive layer. The first light-transmitting plate is thus prevented from separating from the first substrate.

The modification into the first layer may remove at least part of hydrophobic functional groups of the second organic silane polymer layer, thereby forming the first layer.

The modification into the first layer may be performed by irradiating the first substrate with UV light. Hence, the first layer is formed by a dry process.

The modification into the first layer is performed by irradiating the first substrate body with UV light through a mask shielding the region corresponding to the display region. Since this method limits the irradiation with UV light to a specific region, the first organic silane polymer layer formed in the display region can be protected from damage.

The modification into the first layer may be performed by irradiating the first substrate body with UV light from the first surface side. In this instance, the first surface side of the first substrate does not come into contact with a stage when placed on the stage. This reduces the probability of damage to the first organic silane polymer layer and the first alignment layers at the first surface.

The method may further include rinsing the first substrate body with an alcohol and drying the first substrate body to remove the alcohol therefrom, between the treatment of the first substrate with the silane coupling agent and the modification into the first layer. Since rinsing with an alcohol is performed before the modification into the first layer to increase hydrophilicity, the alcohol is easy to dry.

The treatment of the first substrate body with the silane coupling agent and the modification into the first layer may be performed on a mother substrate that is to be divided into a plurality of first substrates.

The method may further includes: forming a second alignment layer with an inorganic film over a third surface of a second substrate body and then treating the second substrate body with a silane coupling agent, thereby simultaneously forming a third organic silane polymer layer at the third surface and a fourth organic silane polymer layer at a fourth surface opposite the third surface; modifying at least a part of the portion of the fourth organic silane polymer layer outside the display region into a second layer having a higher hydrophilicity than the fourth organic silane polymer layer; and bonding a second light-transmitting plate with a second adhesive layer in contact with a region including the second layer. Accordingly, separation does not easily occur at the interface between the fourth organic silane polymer layer and the second adhesive layer. The second light-transmitting plate is thus prevented from separating from the second substrate.

A mother substrate for a liquid crystal device includes a mother substrate body, an inorganic alignment layer and a first organic silane polymer layer that are formed in this order over one of opposing surfaces of the mother substrate body, and a second organic silane polymer layer over the other surface. The second organic silane polymer layer is the same as the first organic silane polymer layer and is at least partially modified into a layer having a higher hydrophilicity than the second organic silane polymer layer.

The invention is also directed to a method for manufacturing a mother substrate for a liquid crystal device. The method includes forming an inorganic alignment layer over one of opposing surfaces of a mother substrate body and then treating the mother substrate body with a silane coupling agent, thereby simultaneously forming a first organic silane polymer layer at the one surface of the mother substrate body and a second organic silane polymer layer at the other surface; and modifying at least a part of the second organic silane polymer layer into a layer having a higher hydrophilicity than the second organic silane polymer layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
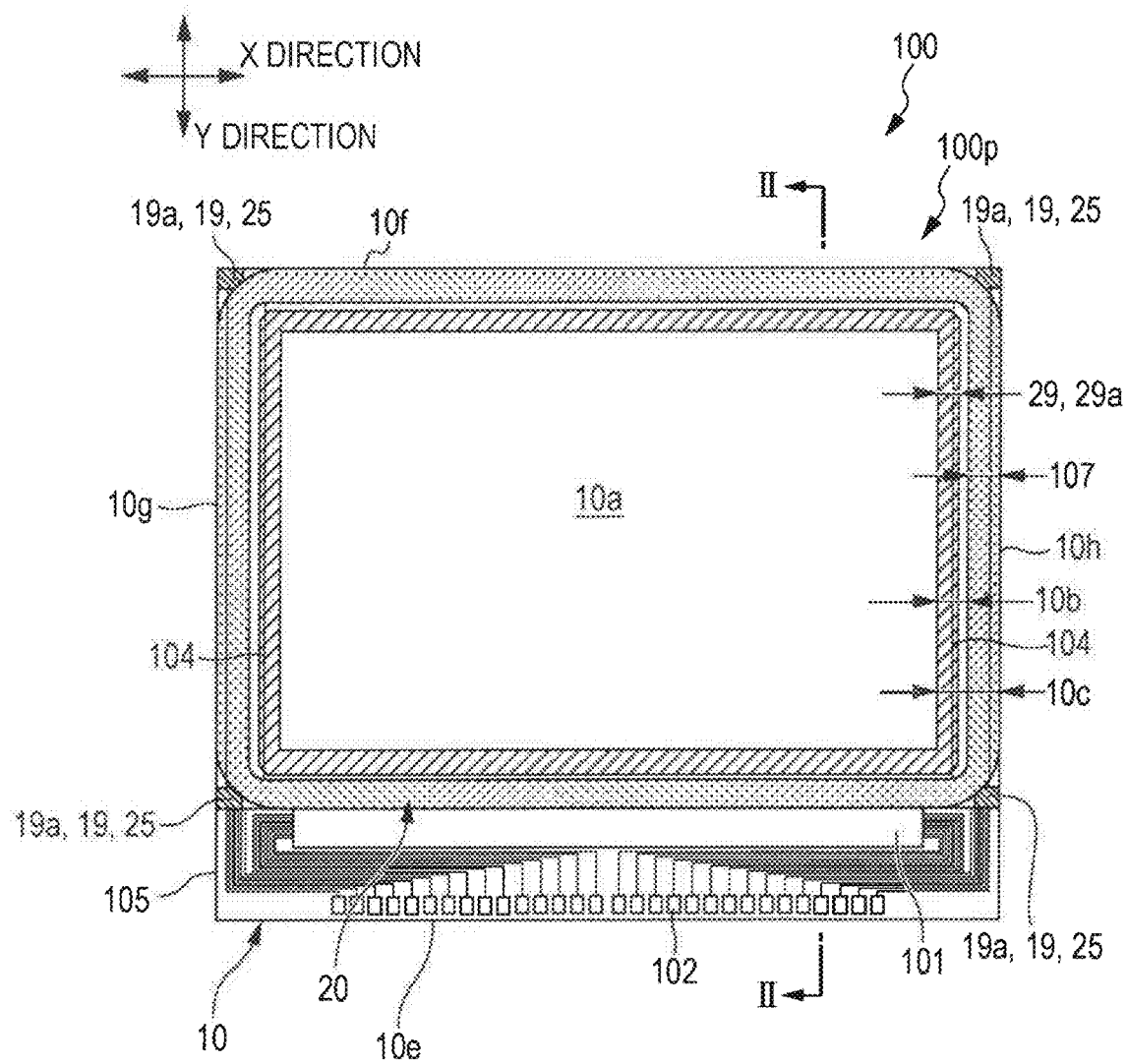
FIG. 1 is a schematic view of a liquid crystal device according to a first embodiment of the invention, viewed from an counter substrate side of the liquid crystal device.

Some embodiments of the invention will now be described. For the sake of visual clarity, the dimensional proportions of the layers and other members in the drawings may be varied as needed.

In the following embodiments, one of an elemental substrate 10 and an counter substrate 20 corresponds to a "first substrate", and the other corresponds to a "second substrate". In the following description, the terms "upper side" and "front side" and similar expressions used for describing the structure of the elemental substrate 10 refer to the side adjacent to a liquid crystal layer 50, and the terms "lower side" and "rear side" refer to the side opposite to the liquid crystal layer 50. Also, the terms "upper side" and "front side" and similar expressions used for describing the structure of the counter substrate 20 refer to the side adjacent to the liquid crystal layer 50, and the terms "lower side" and "rear side" refer to the side opposite to the liquid crystal layer 50.

First Embodiment

Figure 2:
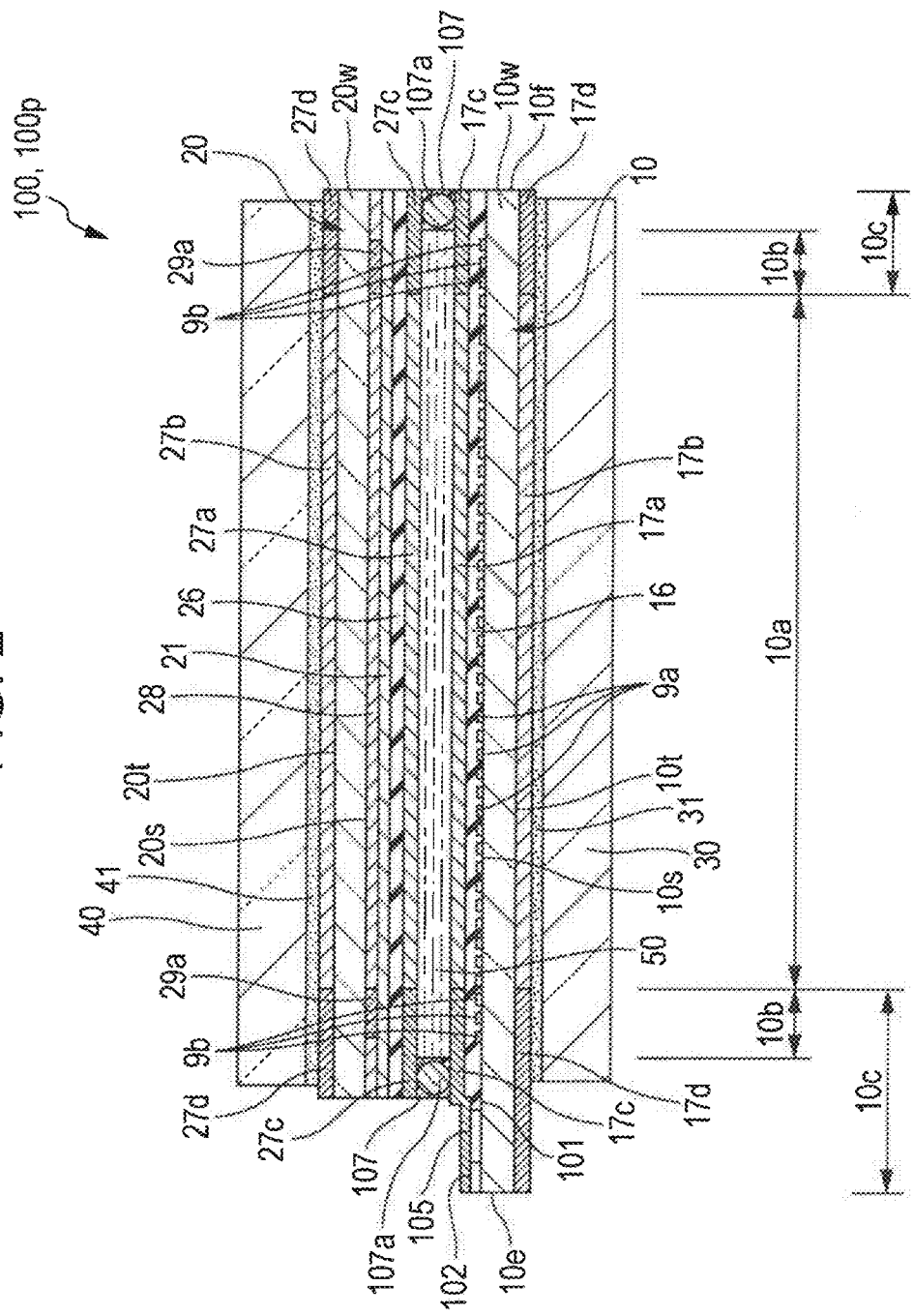
FIG. 2 is a sectional view of the liquid crystal device taken along line II-II in FIG. 1.

FIG. 1 is a schematic view of a liquid crystal device according to a first embodiment of the invention, viewed from an counter substrate side of the liquid crystal device. FIG. 2 is a sectional view of the liquid crystal device taken along line II-II in FIG. 1. In the present embodiment, an elemental substrate 10 corresponds to a "first substrate", and an counter substrate 20 corresponds to a "second substrate". Hence, the correspondence of components in the present embodiment is as follows:

elemental substrate 10 corresponds to "first substrate" of the subject matter of the invention front surface 10s, or one of the surfaces, of an elemental substrate body 10w corresponds to "first surface" of the subject matter of the invention rear surface 10t, or the other surface, of the elemental substrate body 10w corresponds to "second surface" of the subject matter of the invention alignment layer 16 corresponds to "first alignment layer" of the subject matter of the invention organic silane polymer layer 17a corresponds to "first organic silane polymer layer" of the subject matter of the invention organic silane polymer layer 17b corresponds to "second organic silane polymer layer" of the subject matter of the invention layer 17c corresponds to "third layer" of the subject matter of the invention layer 17d corresponds to "first layer" of the subject matter of the invention light-transmitting plate 30 corresponds to "first light-transmitting plate" of the subject matter of the invention adhesive layer 31 corresponds to "first adhesive layer" of the subject matter of the invention counter substrate 20 corresponds to "second substrate" of the subject matter of the invention front surface 20s, or one of the surfaces, of an counter substrate body 20w corresponds to "third surface" of the subject matter of the invention rear surface 20t, or the other surface, of the counter substrate body 20w corresponds to "fourth surface" of the subject matter of the invention alignment layer 26 corresponds to "second alignment layer" of the subject matter of the invention organic silane polymer layer 27a corresponds to "third organic silane polymer layer" of the subject matter of the invention organic silane polymer layer 27b corresponds to "fourth organic silane polymer layer" of the subject matter of the invention layer 27c corresponds to "fourth layer" of the subject matter of the invention layer 27d corresponds to "second layer" of the subject matter of the invention light-transmitting plate 40 corresponds to "second light-transmitting plate" of the subject matter of the invention adhesive layer 41 corresponds to "second adhesive layer" of the subject matter of the invention Silane coupling treatments ST 12 and ST 22 correspond to "treatment of the first substrate body with a silane coupling agent" and "treatment of the second substrate body with a silane coupling agent", respectively, and modifications ST 13 and ST 23 correspond to "modification into a first layer" and "modification into a second layer", respectively. Bonding a light-transmitting plate 30 to the elemental substrate 10 with an adhesive layer 31 in step ST36 corresponds to "bonding a first light-transmitting plate", and bonding a light-transmitting plate 20 to the counter substrate 20 with an adhesive layer 41 in step ST36 corresponds to "bonding a second light-emitting plate".

A liquid crystal device 100 includes a liquid crystal panel 100*p*, as shown in FIGS. 1 and 2. The liquid crystal panel 100*p* includes an elemental substrate 10 (first substrate) and an counter substrate 20 (second substrate) that are bonded together with a sealing member 107 with a predetermined distance between the substrates. The sealing member 107 is disposed in a frame-like manner along the edge of the counter substrate 20. The sealing member 107 is defined by an adhesive of a photo-curable resin, a thermosetting resin, or the like and contains a gap material 107*a*, such as glass fiber or glass beads to maintain a predetermined distance between the two substrates. In the liquid crystal panel 100*p*, a liquid crystal layer 50 is disposed in the region surrounded by the sealing member 107 between the elemental substrate 10 and the counter substrate 20. In the present embodiment, the liquid crystal layer 50 is formed by an ODF (One Drop Fill) method. In this method, for example, after the frame-like sealing member 107 is formed on the element substrate 10 side, a liquid of an electro-optical material is dropped into the space surrounded by the sealing member 107, and, then, the elemental substrate 10 and the counter substrate 20 are bonded together. The sealing member 107 is therefore continuous and closed. Alternatively, the elemental substrate 10 and the counter substrate 20 may be bonded together with a discontinuous or open sealing member 107 having ends forming a gap so that the liquid of the electro-optical material can be vacuum-injected through the gap of the sealing member 107. In this instance, the gap of the sealing member 107 will be sealed with a sealant.

The elemental substrate 10 and the counter substrate 20 of the liquid crystal panel 100*p* are each quadrangular. The elemental substrate 10 has two sides 10*e* and 10*f* that oppose each other in the Y direction and two sides 10*g* and 10*h* that oppose each other in the X direction. The liquid crystal panel 100*p* has a quadrangular display region 10*a* substantially in the center thereof. The sealing member 107 is disposed substantially in a quadrangular frame corresponding to the shape of the display region 10*a* so as to surround the display region 10*a*. A quadrangular frame-like outer region 10*c* is defined outside the display region 10*a*.

The elemental substrate 10 is larger than the counter substrate 20. Accordingly, side 10*e* of the elemental substrate 10 and the vicinity thereof project from the counter substrate 20, defining a projecting portion 105. On the elemental substrate 10, a data line driving circuit 101 and a plurality of terminals 102 are disposed along side 10*e*, and scanning line driving circuits 104 are disposed along sides 10*g* and 10*h* adjacent to side 10*e*. The terminals 102 are connected to a flexible wiring board (not shown) by anisotropic conductive films or the like. Thus, a variety of signals and potentials are transmitted to the elemental substrate 10 from an external control circuit via the flexible wiring board.

The elemental substrate 10 includes an elemental substrate body 10*w* having a front surface 10*s* (first surface) and a rear surface 10*t* (second surface) opposite the front surface 10*s*. The front surface 10*s* opposes the counter substrate 20, and pixel electrodes 9*a* and pixel transistors (not shown) are arranged on the front surface 10*s* side in a matrix manner in the display region 10*a*. Hence, the display region 10*a* is a region where the pixel electrodes 9*a* are arranged in a matrix manner. In the elemental substrate 10, the surfaces of the pixel electrodes 9*a* are covered with an alignment layer 16 (first alignment layer). The outer region 10*c* outside the display region 10*a* includes a quadrangular peripheral region 10*b* between the display region 10*a* and the sealing member 107. In the peripheral region 10*b*, dummy pixel electrodes 9*b* formed simultaneously with the pixel electrodes 9*a* are disposed on the front surface 10*s* side of the elemental substrate body 10*w*.

The counter substrate 20 includes an counter substrate body 20*w* having a front surface 20*s* (third surface) and a rear surface 20*t* (fourth surface) opposite the front surface 20*s*. The front surface 20*s* opposes the elemental substrate 10, and at least one common electrode 21 is disposed on the front surface 20*s* side. The common electrode 21 may cover substantially the entire surface of the counter substrate body 20*w*, or a plurality of strip common electrodes may extend across a plurality of pixels. In the present embodiment, the common electrode 21 is disposed over substantially the entire surface of the counter substrate body 20*w*.

On the front surface 20*s* side of the counter substrate body 20*w*, a light-blocking layer 29*a* is disposed under the common electrodes 21, and an alignment layer 26 (second alignment layer) is disposed over the surface of the common electrode 21. The light-blocking layer 29*a* is a frame extending along the perimeter of the display region 10*a*, and the inner edge of the light-blocking layer 29*a* defines the display region 10*a*. In an embodiment, the light-blocking layer 29*a* may be a black matrix overlying regions between pixel electrodes 9*a*. The outer edge of the light-blocking layer 29*a* lies on the inner side of the inner edge of the sealing member 107 with a gap therebetween. Hence, the light-blocking layer 29*a* does not overlap the sealing member 107.

In the region of the liquid crystal panel 100*p* outside the sealing member 107, inter-substrate conducting electrodes 25 are disposed in the four corners on the front surface 20*s* side of the counter substrate body 20*w*. Also, inter-substrate conducting electrodes 19 are disposed on the front surface 10*s* side of the elemental substrate body 10*w* at positions opposing the four corners (inter-substrate conducting electrodes 25) of the counter substrate body 20*w*. In the present embodiment, part of the common electrode 21 acts as inter-substrate conducting electrodes 25. A common potential Vcom is applied to inter-substrate conducting electrodes 19. Inter-substrate conducting members 19*a* containing electroconductive particles are each disposed between the opposing inter-substrate conducting electrodes 19 and 25. Thus, the common electrode 21 of the counter substrate 20 is electrically connected to the elemental substrate 10 via each set of inter-substrate conducting electrode 19, inter-substrate conducting member 19*a*, and inter-substrate conducting electrode 25. Thus, the common potential Vcom is applied to the common electrode 21 from the elemental substrate 10 side. The sealing member 107 extends along the edge of the counter substrate 20 with a substantially constant width, and the portions of the sealing member 107 corresponding to the corners of the counter substrate 20 are disposed inward so as to avoid the inter-substrate conducting electrodes 19 and 25.

In the present embodiment, the liquid crystal device 100 is of a transmissive type, and the pixel electrodes 9*a* and the common electrode 21 are made of an optically transparent electroconductive material, such as ITO (Indium Tin Oxide) or IZO (Indium Zinc Oxide). In the case of using such a transmissive liquid crystal device (liquid crystal device 100), images are displayed by modulating light traveling in the liquid crystal device from the counter substrate 20 to the elemental substrate 10.

The liquid crystal device 100 may be used, for example, as RGB light valves in a projection display apparatus (liquid crystal projector) that will be described herein below. In this display apparatus, R, G, and B liquid crystal devices 100 each receive corresponding color component light that has been separated by RGB color separation dichroic mirrors, and the thus separated color component lights are emitted as projection light. Hence, color filters are not formed.

Structures of Elemental Substrate 10 and Counter Substrate 20

Figure 3:
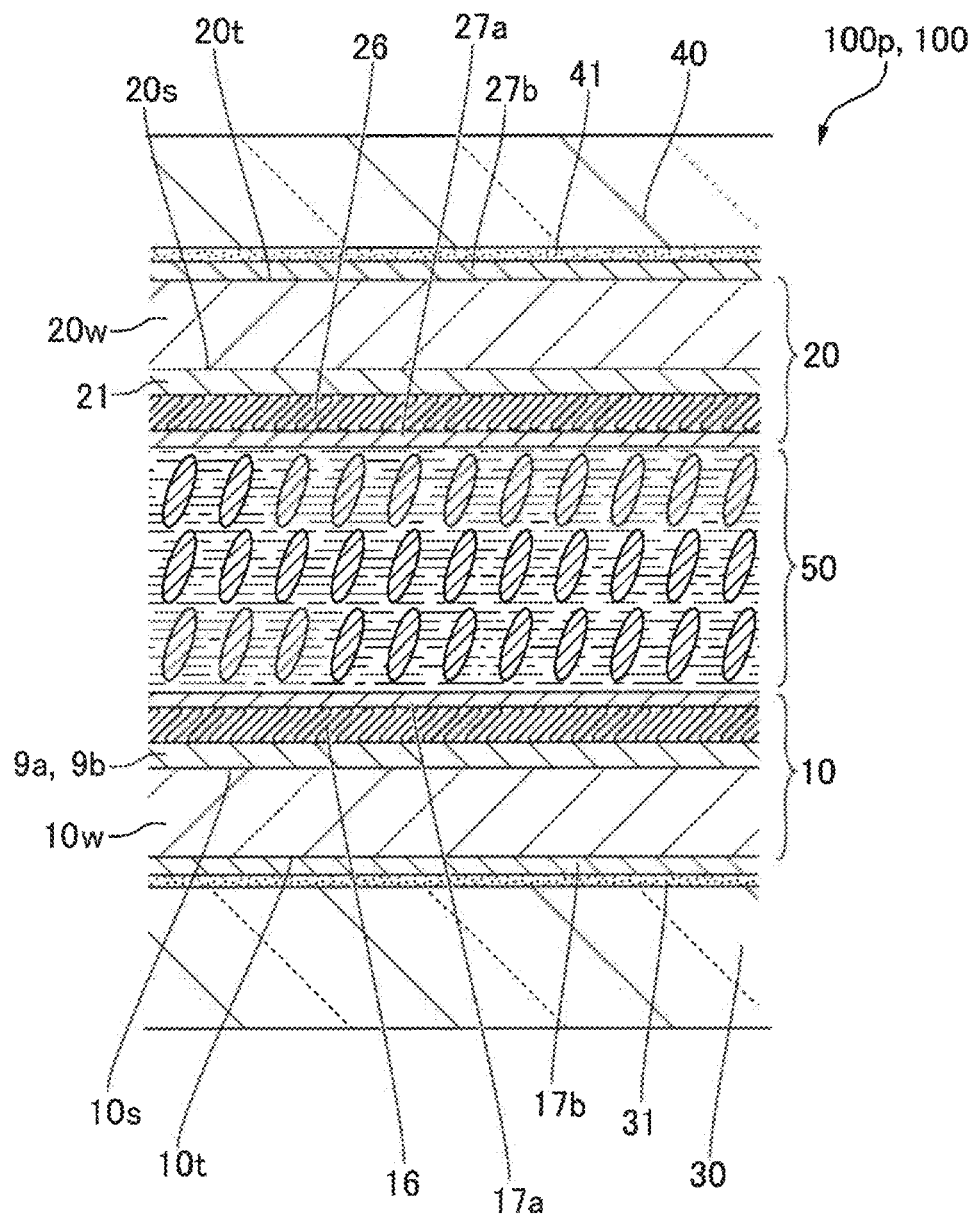
FIG. 3 is an enlarged view of a portion of the liquid crystal device shown in FIG. 2.
Figure 4:
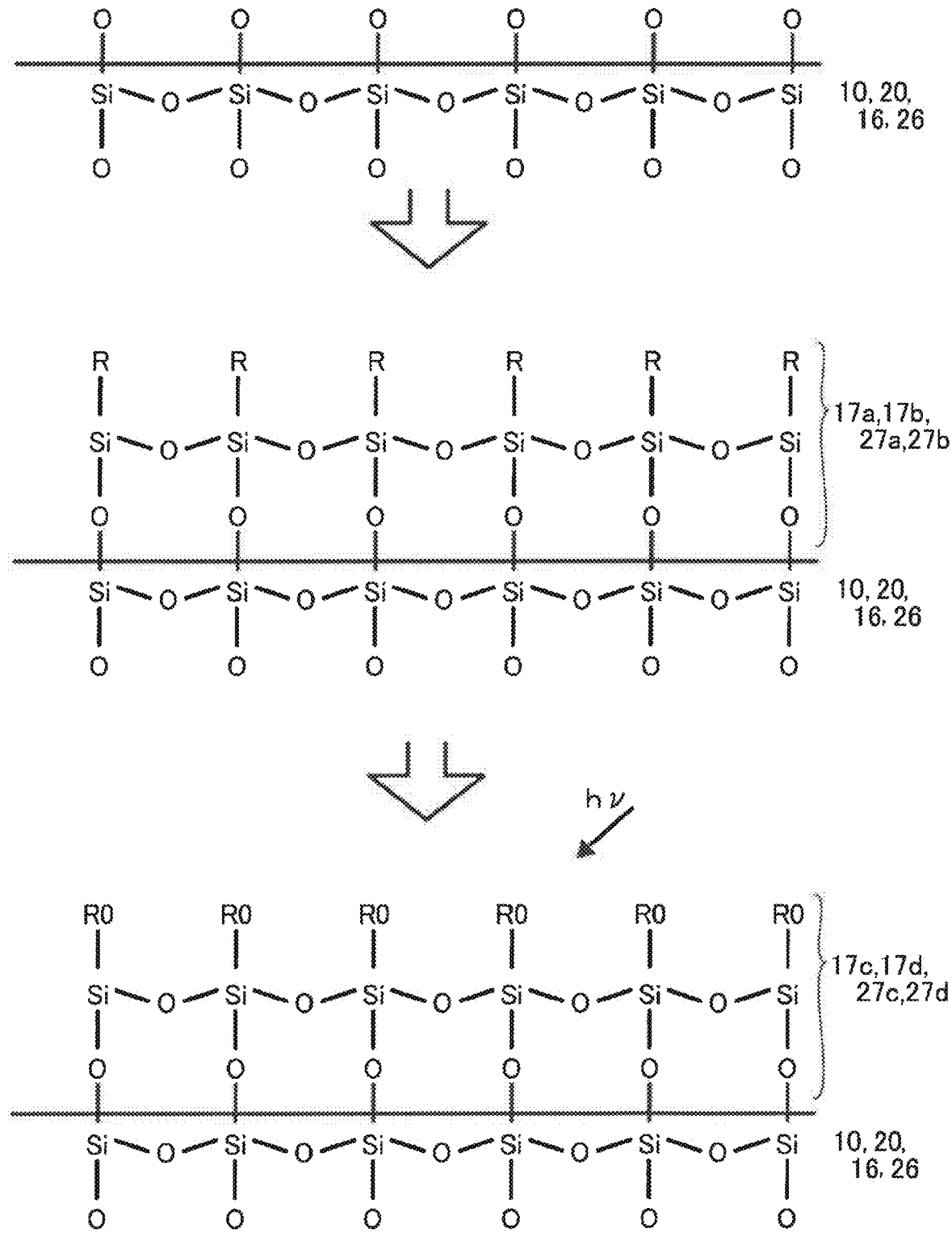
FIG. 4 is an illustrative representation of an organic silane polymer layer shown in FIG. 3.

FIG. 3 is an enlarged view of a portion of the liquid crystal device 100 shown in FIG. 2. FIG. 4 is an illustrative representation of an organic silane polymer layer shown in FIG. 3.

As shown in FIGS. 2 and 3, the elemental substrate body 10w is provided with the alignment layer 16 and the organic silane polymer layer 17a (first organic silane polymer layer) in this order over the front surface 10s thereof. Also, the rear surface 10t of the elemental substrate body 10w is provided with the organic silane polymer layer 17b (second organic silane polymer layer) formed simultaneously with the organic silane polymer layer 17a, an adhesive layer 31 (first adhesive layer), and a light-transmitting plate 30 (first light-transmitting plate) in this order. The light-transmitting plate 30 is made of glass, quartz, or the like and prevents dust or the like from attaching to the rear surface 10t of the elemental substrate body 10w. More specifically, if dust becomes attached to the liquid crystal device 100, it becomes attached to the external surface of the light-transmitting plate 30 (surface opposite the elemental substrate 10), hence being separated from the liquid crystal layer 50. Accordingly, when light from a light source is focused on the liquid crystal layer 50 in a projection display apparatus that will be described herein below, dust is unlikely to be projected on an image.

The counter substrate body 20w is provided with the alignment layer 26 and the organic silane polymer layer 27a (third organic silane polymer layer) in this order over the front surface 20s thereof. Also, the rear surface 20t of the counter substrate body 20w is provided with the organic silane polymer layer 27b (fourth organic silane polymer layer) formed simultaneously with the organic silane polymer layer 27a, an adhesive layer 41 (second adhesive layer), and a light-transmitting plate 40 (second light-transmitting plate) in this order. The light-transmitting plate 40 is made of glass, quartz, or the like and prevents dust or the like from attaching to the rear surface 20t of the counter substrate 20. More specifically, if dust becomes attached to the liquid crystal device 100, it becomes attached to the external surface of the light-transmitting plate 40 (surface opposite the counter substrate 20), hence being separated from the liquid crystal layer 50. Accordingly, when light from a light source is focused on the liquid crystal layer 50 in a projection display apparatus that will be described herein below, dust is unlikely to be projected in an image.

The alignment layers 16 and 26 are each an oblique vapor deposition film defined by inclined columnar structures of an inorganic material, such as $SiO_x$ (x<2), $SiO_2$, $TiO_2$, MgO, $Al_2O_3$, $In_2O_3$, $Sb_2O_3$, or $Ta_2O_5$. Thus, the alignment layers 16 and 26 align the negative dielectric anisotropy nematic liquid crystal molecules in the liquid crystal layer 50 in an inclined vertical direction, so that the liquid crystal panel 100p operates in a normal black VA mode. In the present embodiment, the alignment layers 16 and 26 are made of silicon oxide ($SiO_x$).

At the surface of the alignment layers 16 and 26, dangling bonds of silicon atoms or dimer structures (Si—Si bonds) formed with silicon atoms are present. The dangling bonds are likely to react with water in the liquid crystal or in the atmosphere to form silanol groups (—Si—OH), thus terminated, as shown in the upper part of FIG. 4. Unfortunately, the silanol group is reactive. If the liquid crystal device 100 is used, for example, as a light valve of a projection display apparatus or the like, the liquid crystal device is irradiated with strong light, inducing a photochemical reaction of the silanol groups with the liquid crystal. Accordingly, in the present embodiment, the hydroxy sites (—OH) of the silanol groups at the surface of the alignment layer 16 are bound to an organic silane polymer layer 17a by using a silane coupling agent, such as an organic siloxane (decyl (trimethoxy)silane), as shown in the middle part of FIG. 4. As with the case of the alignment layer 16, the hydroxy sites (—OH) at the surface of the alignment layer 26 are bound to an organic silane polymer layer 27a by using a silane coupling agent, such as an organic siloxane (decyl (trimethoxy)silane).

The silane coupling agent hydrolyzes to have silanol groups (Si—OH). The silanol groups gradually condense to form siloxane bonds (Si—O—Si), thus forming the organic silane polymer layers 17a and 27a. The silane coupling agent also reacts with the surface of inorganic compounds to form strong covalent bonds according to the same mechanism. Examples of the silane coupling agent include n-hexyltrimethoxysilane, n-hexyltriethoxysilane, cyclohexylmethyldimethoxysilane, n-octyltriethoxysilane, and n-decyltrimethoxysilane. In the present embodiment, the silane coupling agent is n-decyltrimethoxysilane, which has the n-decyl group as a hydrophobic functional group.

Structure of Layer

Figure 5:
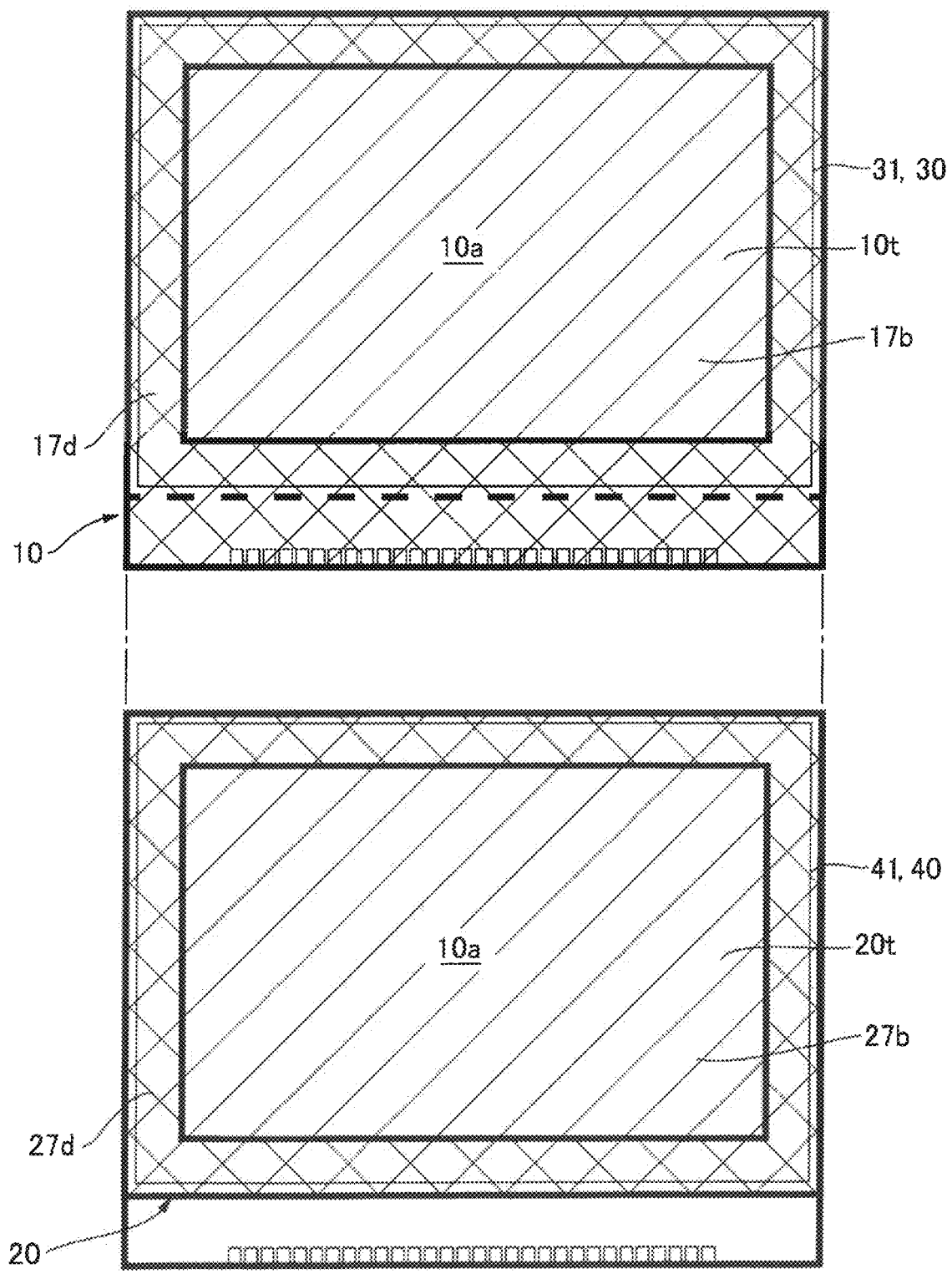
FIG. 5 is an illustrative representation of layers formed in an elemental and an counter substrate shown in FIG. 2.

FIG. 5 is an illustrative representation of layers formed in the elemental substrate 10 and the counter substrate 20 shown in FIG. 2. The upper part of FIG. 5 shows the liquid crystal panel 100p when viewed from the elemental substrate 10 side, and the lower part shows the liquid crystal panel 100p when viewed from the counter substrate 20 side.

As shown in FIG. 5, the organic silane polymer layer 17b is formed over the entirety of the rear surface 10t of the elemental substrate body 10w, represented by the hatched area indicated by lines slanting upward to the right. The light-transmitting layer 30 and the adhesive layer 31 are formed away from the side surfaces of the elemental substrate 10, but spread over a wide region including the display region 10a. In the present embodiment, at least a part of the portion of the organic silane polymer layer 17b in contact with the adhesive layer 31 outside the display region 10a is modified into a layer 17d having a higher hydrophilicity than the organic silane polymer layer 17b. In the present embodiment, the entirety of the portion of the organic silane polymer layer 17b outside the display region 10a is modified into the layer 17d, as represented by the shaded area of FIG. 5 indicated by both lines slanting upward to the right and slanting downward to the right.

The layer 17d has a molecular structure in which at least part of the hydrophobic organic functional groups R of the organic silane polymer layer 17b are removed and changed into functional groups R0, as shown in the lower part of FIG. 4. The layer 17d is thus more hydrophilic than the organic silane polymer layer 17b. In the present embodiment, the layer 17d is formed by irradiating the organic silane polymer layer 17b with energy radiation, such as UV light hv, thereby cutting chemical bonds between silicon atoms and the hydrophobic functional groups R or carbon-carbon bonds of the hydrophobic groups R of the organic silane polymer layer 17b. Since the layer 17d is therefore more hydrophilic than the organic silane polymer layer 17b, the light-transmitting plate 30 can be tightly bonded to the rear surface 10t of the elemental substrate body 10w with the adhesive layer 31.

In the present embodiment, the organic silane polymer layer 17a is disposed over the entire front surface 10s of the element substrate 10w, as shown in FIG. 2, and the entirety of the portion of the organic silane polymer layer 17a outside the display region 10a is modified into the layer 17c having a higher hydrophilicity than the organic silane polymer layer 17a. Hence, the portions of the organic silane polymer layer 17a overlying the terminals 102 and the vicinity thereof or overlapping the sealing member 107 and vicinities thereof are modified into the layer 17c. Therefore, if the terminals 102 are connected to a flexible wiring board by an anisotropic electroconductive film, the flexible wiring board can be tightly fixed to the elemental substrate 10. Also, since the adhesion between the sealing member 107 and the elemental substrate 10 is enhanced, the penetration of moisture or the like through the interface between the sealing member 107 and the elemental substrate 10 can be suppressed.

As shown in FIG. 5, the organic silane polymer layer 27b is formed over the entirety of the rear surface 20t of the counter substrate body 20w represented by the hatched area indicated by lines slanting upward to the right. The light-transmitting layer 40 and the adhesive layer 41 are formed away from the side surfaces of the counter substrate 20, but spread over a wide region including the display region 10a. In the present embodiment, at least a part of the portion of the organic silane polymer layer 27b in contact with the adhesive layer 41 outside the display region 10a is modified into a layer 27d having a higher hydrophilicity than the organic silane polymer layer 27b. In the present embodiment, the entirety of the portion of the organic silane polymer layer 27b outside the display region 10a is the layer 27d, as represented by the shaded area of FIG. 5 indicated by both lines slanting upward to the right and slanting downward to the right. The layer 27d, as well as the layer 17d, has a molecular structure in which at least part of the hydrophobic organic functional groups R of the organic silane polymer layer 27b are removed and changed into functional groups R0. The layer 27d is thus more hydrophilic than the organic silane polymer layer 27b. Accordingly, the light-transmitting layer 40 can be tightly bonded to the rear surface 20t of the counter substrate body 20w with the adhesive layer 41.

In the present embodiment, the organic silane polymer layer 27a is disposed over the entire front surface 20s of the counter substrate body 20w, as shown in FIG. 2, and the entirety of the portion of the organic silane polymer layer 27a outside the display region 10a is modified into the layer 27c having a higher hydrophilicity than the organic silane polymer layer 27a. Accordingly, the portions of the organic silane polymer layer 27a overlapping the sealing member 107 shown in FIG. 1 and vicinities thereof are also modified into the layer 27c. Since the adhesion between the sealing member 107 and the counter substrate 20 is thus enhanced, the penetration of moisture or the like through the interface between the sealing member 107 and the counter substrate 20 can be suppressed.

Method for Manufacturing Liquid Crystal Device 100

Figure 6:
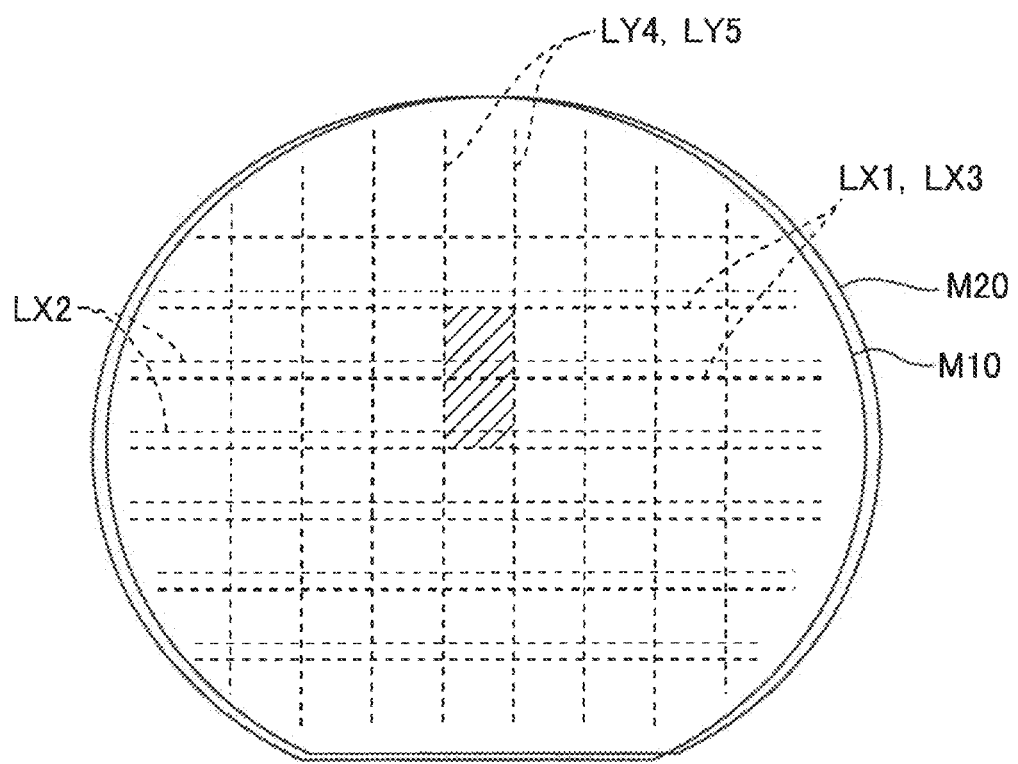
FIG. 6 is an illustrative representation of a mother substrate used in manufacture of the liquid crystal device of the first embodiment.
Figure 7:
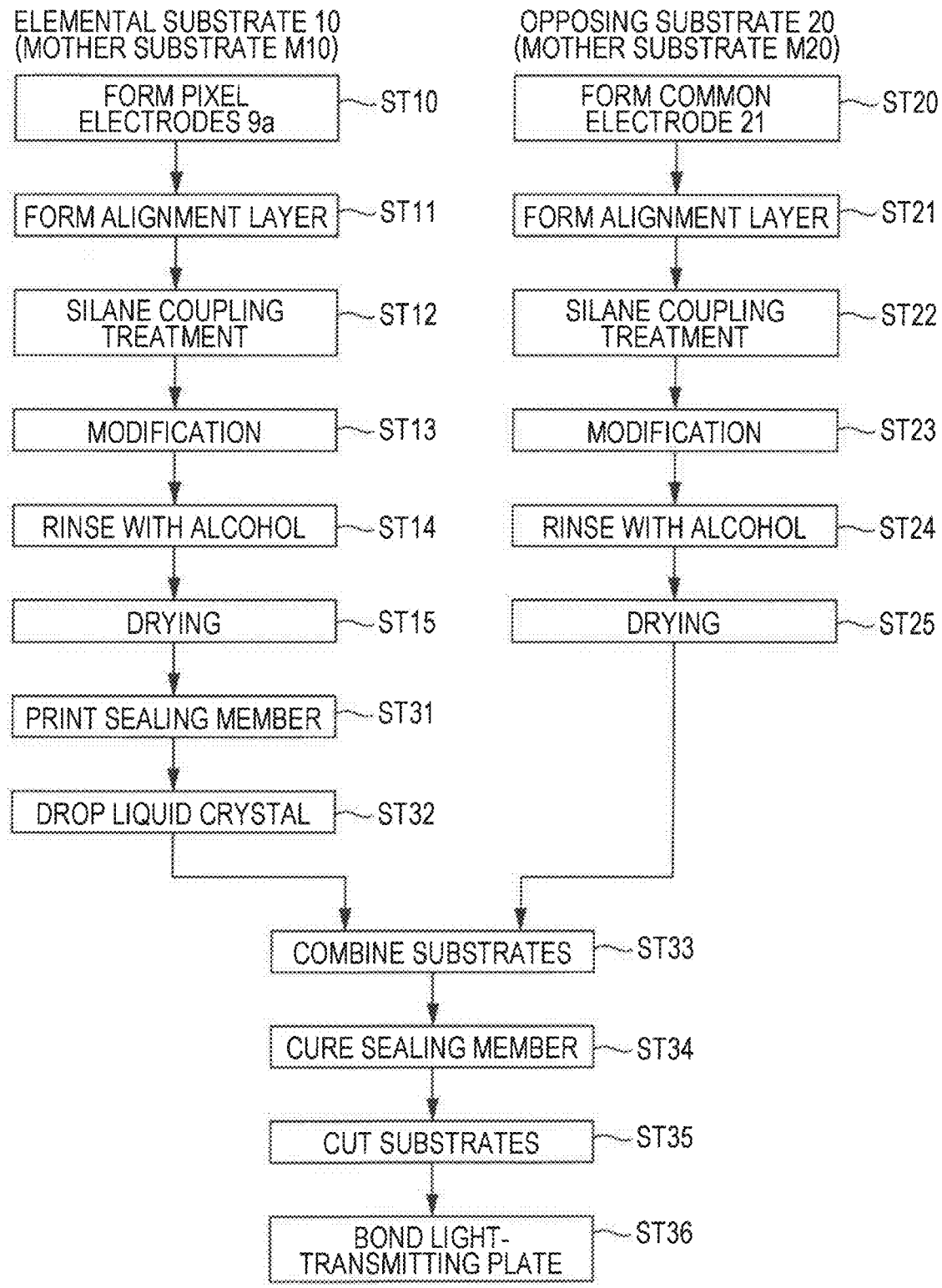
FIG. 7 is a representation of a process for manufacturing the liquid crystal device according to the first embodiment.
Figure 8:
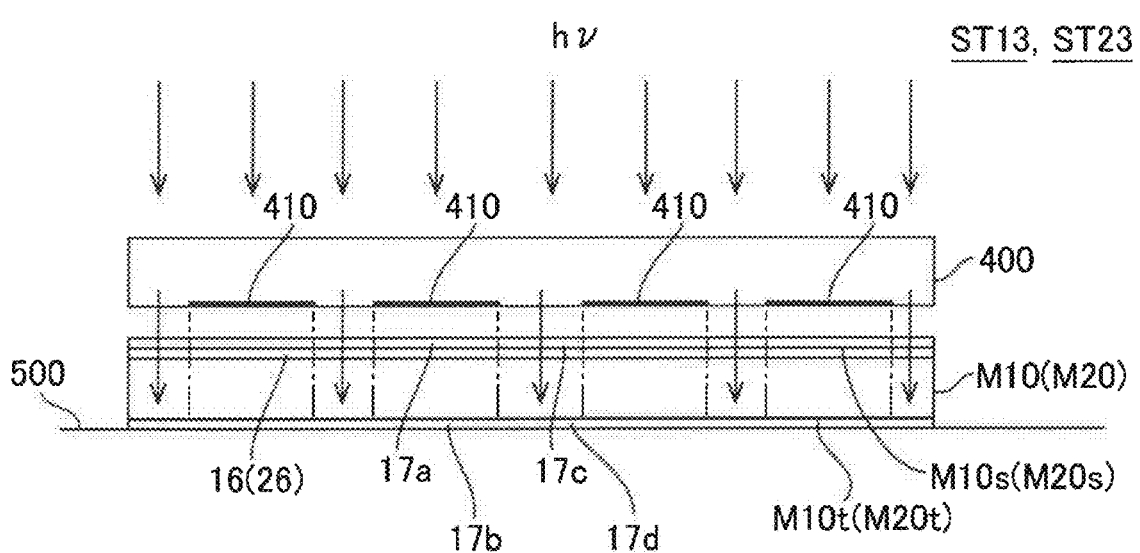
FIG. 8 is an illustrative representation of the modification shown in FIG. 7.

FIG. 6 is an illustrative representation of a mother substrate used in manufacture of the liquid crystal device 100 according to the first embodiment. FIG. 7 is a representation of a process for manufacturing the liquid crystal device 100 according to the first embodiment. FIG. 8 is an illustrative representation of steps ST13 and ST23 of modification shown in FIG. 7. Note that FIG. 6 shows two mother substrates as if they were slightly displaced in different directions.

For manufacturing the liquid crystal device 100 of the first embodiment, for example, the elemental substrate 10 and the counter substrate 20 respectively in large mother substrates M10 and M20 are bonded together, as shown in FIG. 6. Then, the mother substrate M20 for the counter substrates 20 is cut along dividing lines LX1, LX2, and LY4, and the mother substrate M10 for the elemental substrates 10 is cut along dividing lines LX3 and LY5. Alternatively, the mother substrate M20 may be cut into counter substrates 20, and the discrete counter substrates 20 are bonded to the large mother substrate M10 for elemental substrates 10. In this instance, the mother substrate M10 for elemental substrates 10 is cut along the dividing lines, thus dividing into discrete liquid crystal panels 100p. Although either method may be applied, the process described below uses the method shown in FIG. 6.

First, pixel electrodes 9a and the like are formed on a mother substrate body for a mother substrate M10 for elemental substrates in step ST10, as shown in FIG. 7. Then, the front surface M10s of the mother substrate body, corresponding to the front surface 10s of the elemental substrate body 10w, is subjected to oblique vapor deposition to form an inorganic alignment layer 16 of a silicon oxide film (see FIG. 8) in step ST11.

Subsequently, in step ST12, the resulting mother substrate body is brought into contact with a solution containing a silane coupling agent or a gas of the silane coupling agent for hydrolysis and condensation, thus forming an organic silane polymer layer 17a over the front surface M10s of the mother substrate body (see FIG. 8). At this time, the other surface or the rear surface M10t of the mother substrate body, corresponding to the rear surface 10t of the elemental substrate body 10w, is also brought into contact with the silane coupling agent and, thus, the organic silane polymer layer 17b is formed over the rear surface M10t of the mother substrate body.

Next, the organic silane polymer layer 17b over the rear surface M10t of the mother substrate body is partially modified into a layer 17d in step ST13 (see FIG. 8). Subsequently, in step ST14, the resulting mother substrate M10 is rinsed with an alcohol, such as isopropyl alcohol, to remove the silane coupling agent that is not fixed to the mother substrate body. Then, the mother substrate M10 is dried in step ST15.

On a mother substrate body for a mother substrate M20 for counter substrates, common electrodes 21 and the like are formed in step ST20. Then, the front surface M20s of the mother substrate body, corresponding to the front surface 20s of the counter substrate body 20w, is subjected to oblique vapor deposition to form an inorganic alignment layer 26 of a silicon oxide film in step ST21.

Subsequently, in step ST22, the resulting mother substrate body is brought into contact with a solution containing a silane coupling agent or a gas of the silane coupling agent for hydrolysis and condensation, thus forming an organic silane polymer layer 27a over the front surface M20s of the mother substrate body (see FIG. 8). At this time, the other surface or the rear surface M20t of the mother substrate body, corresponding to the rear surface 20t of the counter substrate body 20w, is also brought into contact with the silane coupling agent and, thus, the organic silane polymer layer 27b is formed over the rear surface M20t of the mother substrate body.

Next, the organic silane polymer layer 27b over the rear surface M20t of the mother substrate body is partially modified into a layer 27d in step ST23. Subsequently, in step ST24, the resulting mother substrate M20 is rinsed with an alcohol, such as isopropyl alcohol, to remove the silane coupling agent that is not fixed to the mother substrate body. Then, the mother substrate M20 is dried in step ST25.

Next, in step ST31, a frame-like sealing member (not cured) 107 is printed on the front surface M10s side of the mother substrate M10. Then, a liquid crystal is dropped into the area surrounded by the sealing member 107 in step ST32. Then, the mother substrates M10 and M20 are placed on one top of the other to combine the substrates together in step ST33, and the sealing member 107 is cured in step ST34 to bond the mother substrates M10 and M20 together with the sealing member 107. Subsequently, in step ST35, the mother substrates M10 and M20 are cut along dividing lines LX1, LX2, LX3, LY4, and LY5, as shown in FIG. 6, thus yielding liquid crystal panels 100p.

Then, in step ST36, a light-transmitting plate 30 is bonded to the rear surface 10t side of the elemental substrate 10 with an adhesive layer 31 (bonding a first light-transmitting plate), and another light-transmitting plate 40 is bonded to the rear surface 20t side of the counter substrate 20 with an adhesive layer 41 (bonding a second light-transmitting plate). Thus, a liquid crystal device 100 is completed.

Modification in Steps ST13 and ST23

Figure 9:
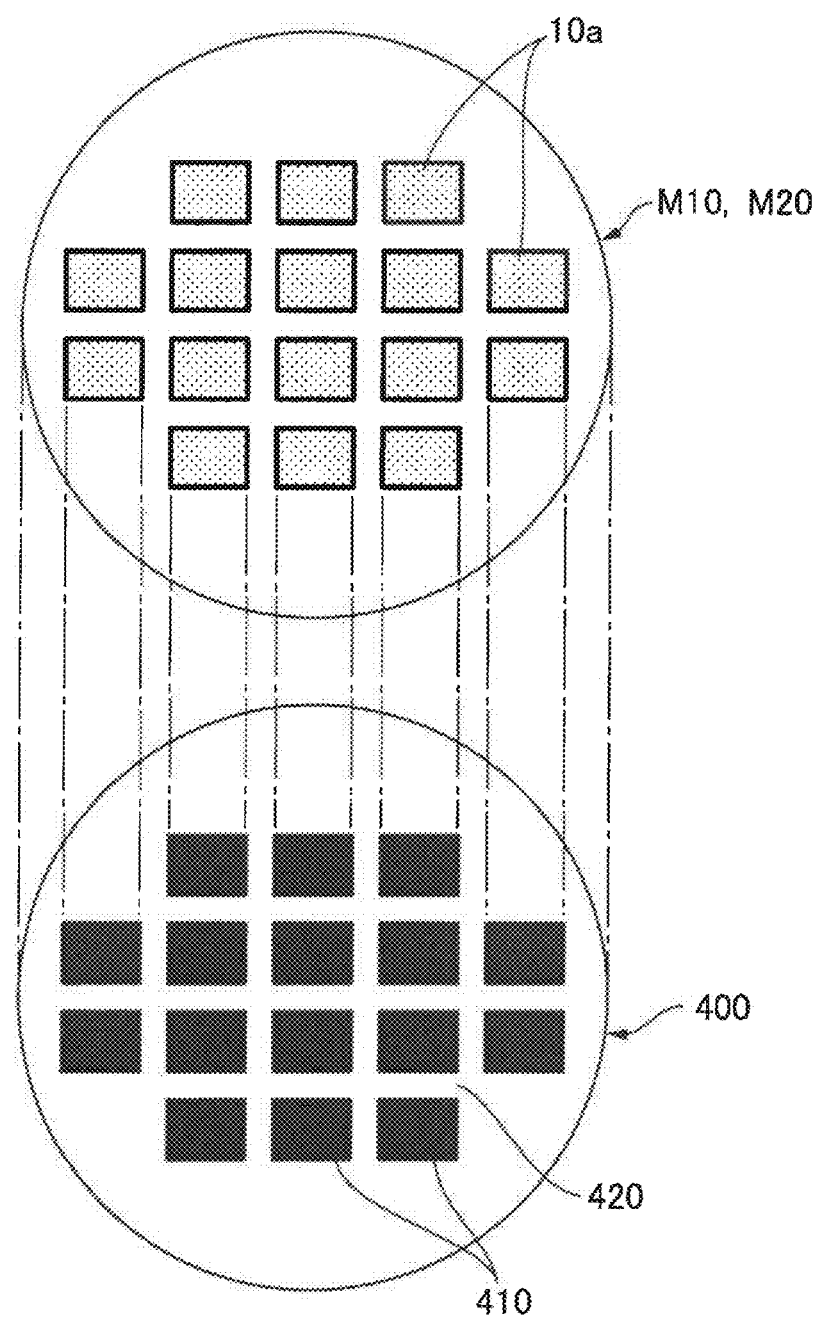
FIG. 9 is an illustrative representation of the mask shown in FIG. 8.

FIG. 9 is an illustrative representation of a mask 400 shown in FIG. 8. In the method for manufacturing the display device 100 of the present embodiment, the alignment layer 16 and the organic silane polymer layer 27a are formed on the front surface M10s side of the mother substrate M10 for the elemental substrate, as shown in FIG. 8, and, then, the mother substrate M10 is placed on a stage 500 in step ST13. The stage 500 holds the outer edge of the mother substrate M10.

Then, the mother substrate M10 is irradiated with UV light hv. At this time, the side of the mother substrate M10 to be irradiated with UV light hv is covered with a mask 400. Therefore, the mother substrate M10 is irradiated with UV light hv that has passed through the light-transmitting region 420 of the mask 400, and the portion of the organic silane polymer layer 27b irradiated with the UV light hv is modified into the layer 27d. In the present embodiment, the UV light hv is excimer UV light having a wavelength of 1722 nm.

As shown in FIG. 9, the mask 400 used in the present embodiment has light-blocking regions 410 corresponding to the display regions 10a of the mother substrate M10, and the other region is a light-transmitting region 420. Hence, the entirety of the mother substrate M10 except the display regions 10a is irradiated with UV light hv.

In the present embodiment, the mother substrate M10 is placed on the stage 500 with the front surface M10s facing upward, as shown in FIG. 8. Hence, the front surface M10s side of the mother substrate M10 does not come into contact with the stage 500. Thus, the organic silane polymer layer 17a and the alignment layer 16 on the front surface M10s side of the mother substrate M10 are prevented from being damaged.

Also, the mask 400 is placed over the front surface M10s side of the mother substrate M10, and the UV light hv is emitted toward the front surface M10s side. In this instance, the UV light hv reaches the rear surface M10t of the mother substrate body (element substrate body 10w) because the mother substrate body (element substrate body 10w) is optically transparent. Although the mother substrate M10 is provided with conducting wires or the like on the front surface M10s side thereof, UV light hv can be transmitted to the opposite side, or the rear surface M10t side of the mother substrate M10 (elemental substrate 10) by scattering. The organic silane polymer layer 17b on the rear surface M10t side of the mother substrate M10 thus can be modified into a layer 17d in the entirety of the portion except the display regions 10a.

The organic silane polymer layer 17a on the front surface M10s side of the mother substrate M10 may also be modified into a layer 17c in the entirety of the portion except the display regions 10a. On the front surface M10s side of the mother substrate M10, thus, the portion of the organic silane polymer layer 17a under the sealing member 107 and the terminals 102 shown in FIG. 1 and around them can be modified into the layer 17c.

For the mother substrate M20 for counter substrates, the same modification is performed in step ST23, as suggested by the numerals in parenthesis in FIG. 8, and thus description thereof is omitted.

Advantages of the Present Embodiment

In the present embodiment, the alignment layer 16 (first alignment layer) over the front surface 10s (first surface) of the elemental substrate body 10w and the alignment layer 26 (second alignment layer) over the front surface 20s (third surface) of the counter substrate body 20w are each made of a silicon oxide film, as described above. The silanol groups of the alignment layers 16 and 26 are respectively bound to organic silane polymer layers 17a (first organic silane polymer layer) and organic silane polymer layer 27a (third organic silane polymer layer) that are formed by condensation of the silane coupling agent. Thus, the reactive groups such as silanol groups are prevented from photochemically reacting with the liquid crystal layer.

Similarly, organic silane polymer layer 17b (second organic silane polymer layer) and organic silane polymer layer 27b (fourth organic silane polymer layer) are formed over the rear surface 10t (second surface) of the elemental substrate body 10w and the rear surface 20t (fourth surface) of the counter substrate body 20w. However, the portion of each of the organic silane polymer layers 17b and 27b outside the display region 10a in contact with the corresponding adhesive layer 31 (first adhesive layer) or 41 (second adhesive layer) is at least partially modified into the layer 17d (first layer) or 27d (second layer) having a higher hydrophilicity than the corresponding organic silane polymer layer 17b or 27b. Thus, separation is unlikely to occur at the interfaces between organic silane polymer layer 17b and adhesive layer 31 and between organic silane polymer layer 27b and adhesive layer 41. The light-transmitting plates 30 and 40 (first light-transmitting plate and second light-transmitting plate) are thus prevented from separating from the respective substrates.

Second Embodiment

Figure 10:
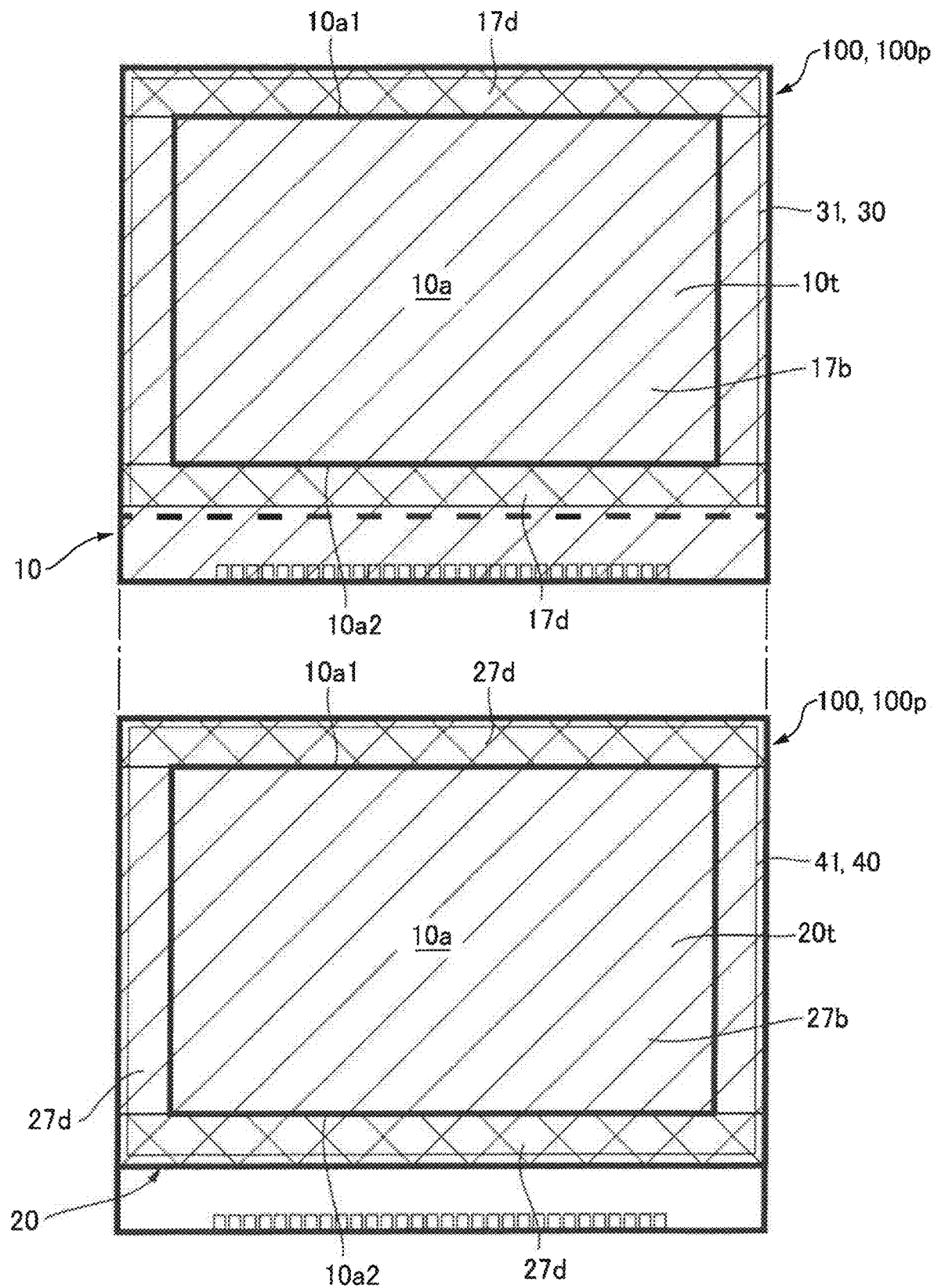
FIG. 10 is an illustrative representation of layers of a liquid crystal device according to a second embodiment of the invention.

FIG. 10 is an illustrative representation of layers of a liquid crystal device 100 according to a second embodiment of the invention. The upper part of FIG. 10 shows the liquid crystal panel 100p when viewed from the elemental substrate 10 side, and the lower part shows the liquid crystal panel 100p when viewed from the counter substrate 20 side. The fundamental structures of the present embodiment and subsequent third and fourth embodiments are the same as that of the first embodiment. Like elements are denoted by like numerals, and thus description thereof is omitted.

In the first embodiment, the entirety of the frame-like portion of organic silane polymer layer 17b in contact with adhesive layer 31 outside the display region 10a is modified into layer 17*d*; and the entirety of the frame-like portion of organic silane polymer layer 27*b* in contact with adhesive layer 41 outside the display region 10*a* is modified into layer 27*d*. In the present embodiment, on the other hand, a part of frame-like portion of the organic silane polymer layer 17*b* in contact with adhesive layer 31 outside the display region 10*a* is modified into layer 17*d*; and a part of the frame-like portion of organic silane polymer layer 27*b* in contact with adhesive layer 41 outside the display region 10*a* is modified into layer 27*d*.

In the present embodiment, the frame-like portion of organic silane polymer layer 17*b* in contact with adhesive layer 31 outside the display region 10*a* is modified into layer 17*d* at least at two portions separated by the display region 10*a*; and the frame-like portion of organic silane polymer layer 27*b* in contact with adhesive layer 41 outside the display region 10*a* is modified into layer 27*d* at least at two portions separated by the display region 10*a*.

More specifically, the frame-like portion of organic silane polymer layer 17*b* in contact with adhesive layer 31 outside the display region 10*a* is modified into layer 17*d* at portions along two opposing sides 10*a*l and 10*a*2 of the display region 10*a*. Similarly, the frame-like portion of the organic silane polymer layer 27*b* in contact with adhesive layer 41 outside the display region 10*a* is modified into layer 27*d* at portions along two opposing sides 10*a*l and 10*a*2 of the display region 10*a*.

In the present embodiment, as well as the first embodiment, separation of the light-transmitting plates 30 and 40 from the elemental substrate 10 and the counter substrate 20 is suppressed.

Third Embodiment

Figure 11:
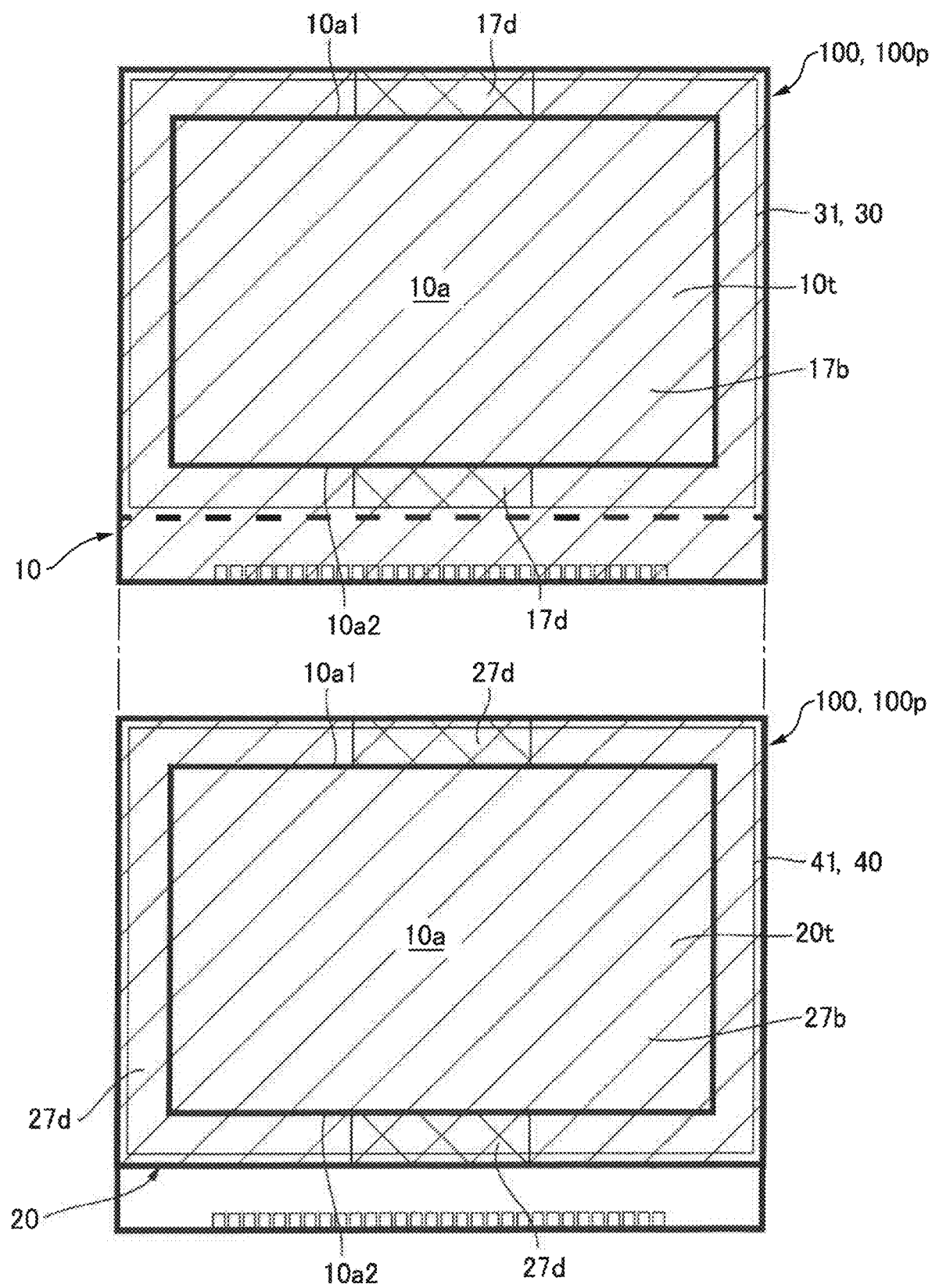
FIG. 11 is an illustrative representation of layers of a liquid crystal device according to a third embodiment of the invention.

FIG. 11 is an illustrative representation of layers of a liquid crystal device 100 according to a third embodiment of the invention. The upper part of FIG. 11 shows the liquid crystal panel 100*p* when viewed from the elemental substrate 10 side, and the lower part shows the liquid crystal panel 100*p* when viewed from the counter substrate 20 side. In the present embodiment, the frame-like portion of organic silane polymer layer 17*b* in contact with adhesive layer 31 outside the display region 10*a* is modified into layer 17*d* at intermediate portions (substantially middles) of the portions along two opposing sides 10*a*l and 10*a*2 of the display region 10*a*, as shown in FIG. 11. Similarly, the frame-like portion of organic silane polymer layer 27*b* in contact with adhesive layer 41 outside the display region 10*a* is modified into layer 27*d* at intermediate portions (substantially middles) of the portions along two opposing sides 10*a*l and 10*a*2 of the display region 10*a*. In the present embodiment, as well as the first embodiment, separation of the light-transmitting plates 30 and 40 from the elemental substrate 10 and the counter substrate 20 is suppressed.

Fourth Embodiment

Figure 12:
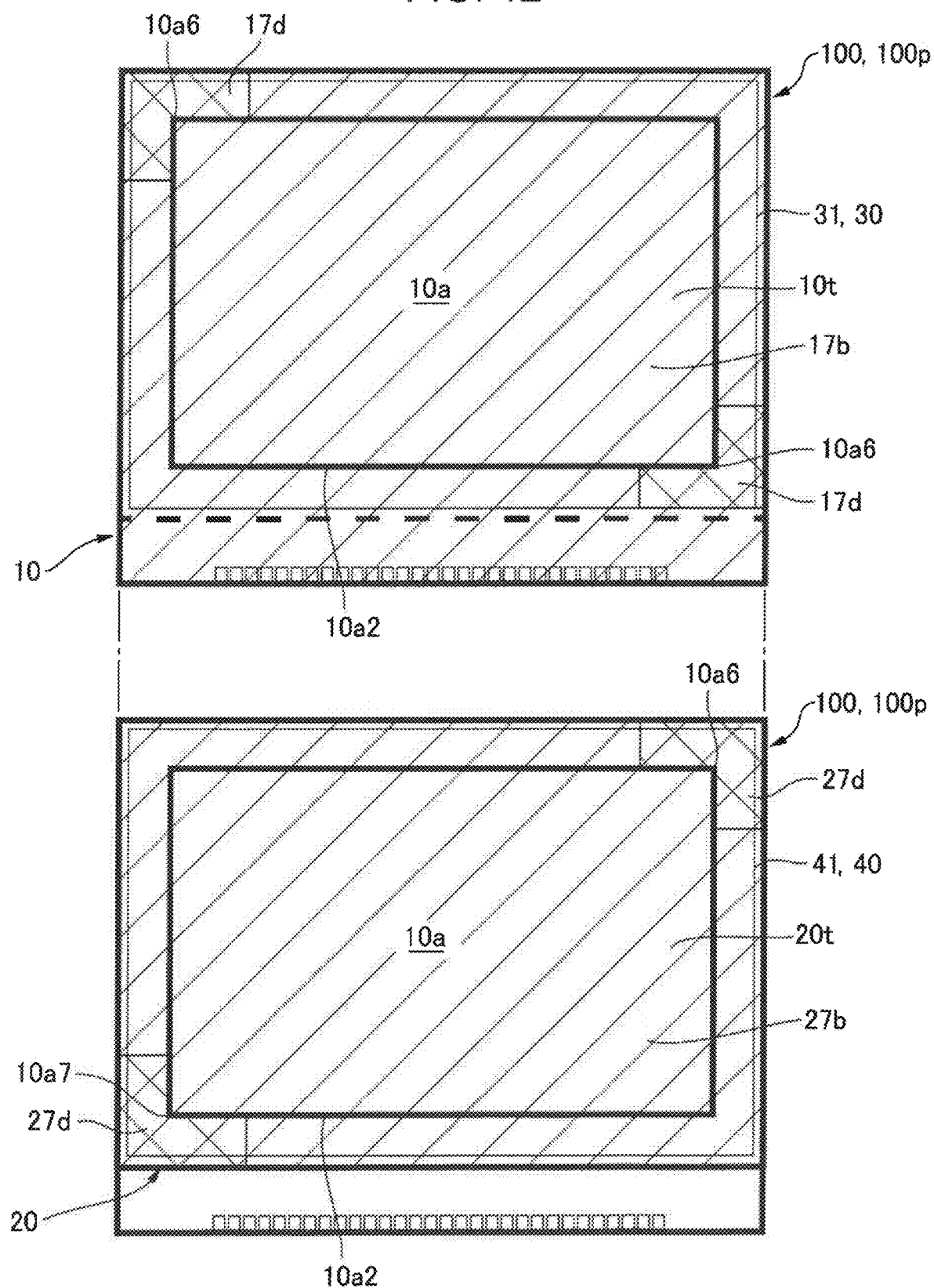
FIG. 12 is an illustrative representation of layers of a liquid crystal device according to a fourth embodiment of the invention.

FIG. 12 is an illustrative representation of layers of a liquid crystal device 100 according to a fourth embodiment of the invention. The upper part of FIG. 12 shows the liquid crystal panel 100*p* when viewed from the elemental substrate 10 side, and the lower part shows the liquid crystal panel 100*p* when viewed from the counter substrate 20 side. In the present embodiment, the frame-like portion of organic silane polymer layer 17*b* in contact with adhesive layer 31 outside the display region 10*a* is modified into layer 17*d* at two opposing corners 10*a*6 and 10*a*7 of the display region 10*a*, as shown in FIG. 12. Similarly, the frame-like portion of organic silane polymer layer 27*b* in contact with adhesive layer 41 outside the display region 10*a* is modified into layer 27*d* at two opposing corners 10*a*6 and 10*a*7 of the display region 10*a*. In the present embodiment, as well as the first embodiment, separation of the light-transmitting plates 30 and 40 from the elemental substrate 10 and the counter substrate 20 is suppressed.

Fifth Embodiment

Figure 13:
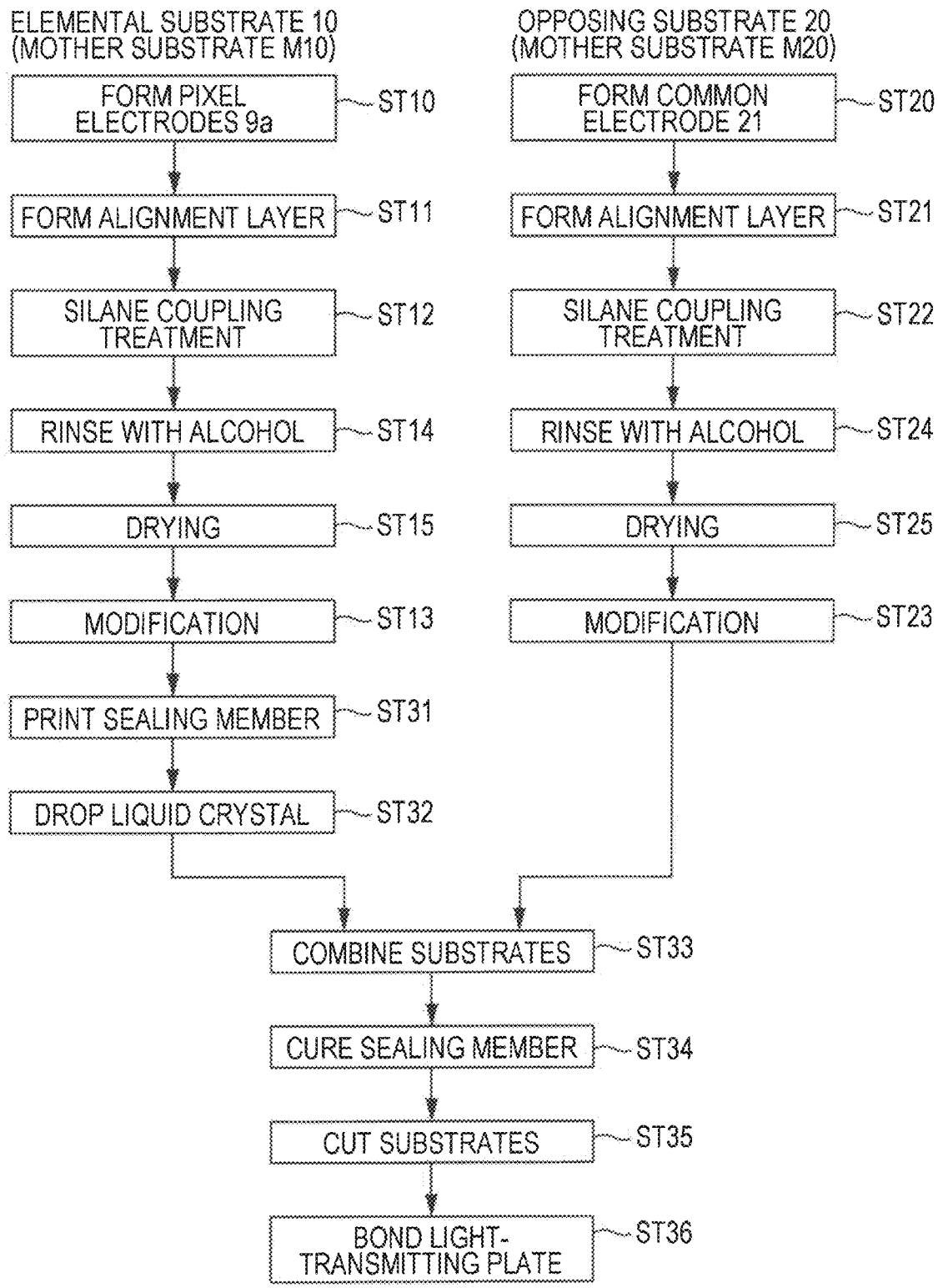
FIG. 13 is a representation of another process for manufacturing the liquid crystal device according to the first embodiment.

FIG. 13 is a representation of another process for manufacturing the liquid crystal device 100 according to the first embodiment. Since the fundamental structure of the device described in the present embodiment is the same as that of the first embodiment, like elements are denoted by like numerals and thus description thereof is omitted.

The process shown in FIG. 7, the modification in steps ST13 and ST23 is performed before rinsing with alcohol in step ST14 or ST24 and drying in step ST15 or ST25. On the other hand, in the present embodiment, the modification in steps ST13 and ST23 is performed after rinsing with alcohol in step ST14 or ST24 and drying in step ST15 or ST25, as shown in FIG. 13. Since rinsing with an alcohol is performed before increasing hydrophilicity by the modification in steps ST13 and ST23, the alcohol is easy to dry.

Sixth Embodiment

Figure 14:
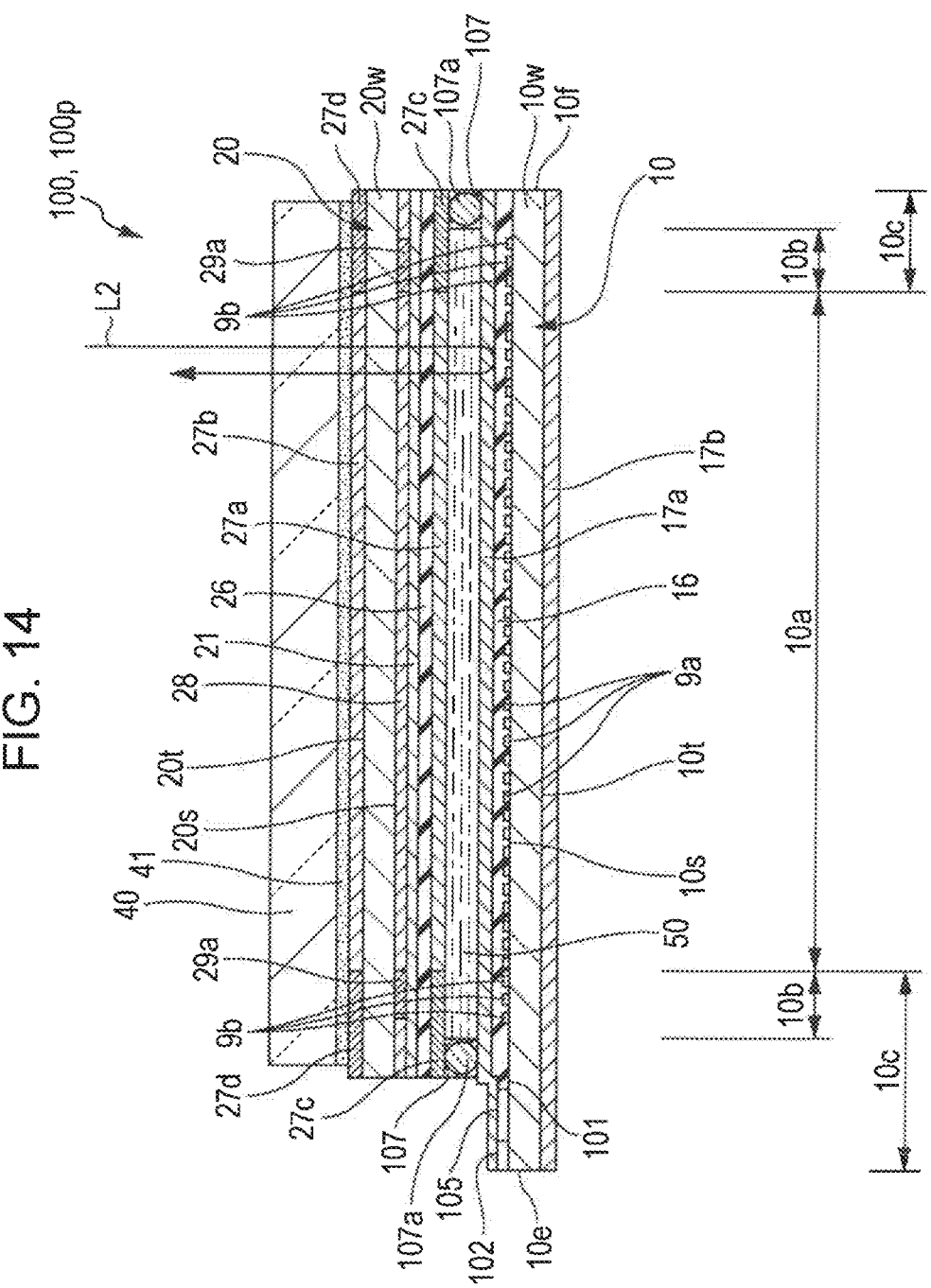
FIG. 14 is an illustrative representation of a liquid crystal device according to a sixth embodiment of the invention.

FIG. 14 is an illustrative representation of a liquid crystal device 100 according to a sixth embodiment of the invention. Since the fundamental structure of the device described in the present embodiment is the same as that of the first embodiment, like elements are denoted by like numerals and thus description thereof is omitted.

Although both the elemental substrate 10 and the counter substrate 20 are provided with the inorganic alignment layer and the organic silane polymer layer in the first embodiment, the inorganic alignment layer and the organic silane polymer layer may be provided for either the elemental substrate 10 or the counter substrate 20.

For example, the liquid crystal device 100 shown in FIG. 14 is of a reflection type, and the pixel electrodes 9*a* of this device are made of a reflective electroconductive film, such as an aluminum film. In this instance, images are displayed by modulating light traveling in the liquid crystal device 100 from the counter substrate 20 to the elemental substrate 10, reflected at the elemental substrate 10, and going out of the device 100, as indicated by arrow L2. Accordingly, a light-transmitting plate 40 is bonded to the rear surface 20*t* of the counter substrate 20 with an adhesive layer 41, but is not to the rear surface 10*t* of the elemental substrate 10.

In the present embodiment, the counter substrate 20 corresponds to the "first substrate", and the elemental substrate 10 corresponds to the "second substrate". Hence, the correspondence of components in the present embodiment is as follows:

front surface 20*s*, or one of the surfaces, of the counter substrate 20 corresponds to "first surface" of the subject matter of the invention rear surface 20*t*, or the other surface, of the counter substrate 20 corresponds to "second surface" of the subject matter of the invention alignment layer 26 corresponds to "first alignment layer" of the subject matter of the invention organic silane polymer layer 27a corresponds to "first organic silane polymer layer" of the subject matter of the invention organic silane polymer layer 27b corresponds to "second organic silane polymer layer" of the subject matter of the invention layer 27c corresponds to "third layer" of the subject matter of the invention layer 27d corresponds to "first layer" of the subject matter of the invention light-transmitting plate 40 corresponds to "first light-transmitting plate" of the subject matter of the invention adhesive layer 41 corresponds to "first adhesive layer" of the subject matter of the invention front surface 10s, or one of the surfaces, of the elemental substrate 10 corresponds to "third surface" of the subject matter of the invention rear surface 10t, or the other surface, of the elemental substrate 10 corresponds to "fourth surface" of the subject matter of the invention alignment layer 16 corresponds to "second alignment layer" of the subject matter of the invention Silane coupling treatment in step ST12 and silane coupling treatment in step ST22 correspond to "treating the second substrate with a silane coupling agent" and "treating the first substrate with a silane coupling agent", respectively, and modification in step ST13 and modification in step ST23 correspond to "modifying at least a part of the fourth organic silane polymer layer" and "modifying at least a part of the second organic silane polymer layer", respectively. Also, in step ST 36, bonding a light-transmitting plate 40 to the counter substrate 20 with an adhesive layer 41 corresponds to "bonding a first light-transmitting plate", and bonding a light-transmitting plate 30 to the elemental substrate 10 with an adhesive layer 31 corresponds to bonding a second light-transmitting plate".

In the present embodiment, at least a part of the portion of organic silane polymer layer 27b in contact with adhesive layer 41 outside the display region 10a is modified into layer 27d having a higher hydrophilicity than organic silane polymer layer 27b. Thus, separation of the light-transmitting plate 40 from the counter substrate 20 is suppressed.

Modification of Disclosed Embodiments

Although the layers are formed by irradiation with UV light in the above embodiments, the modification may be performed by irradiation with laser light or plasma.

Application to Electronic Apparatus

Figure 15:
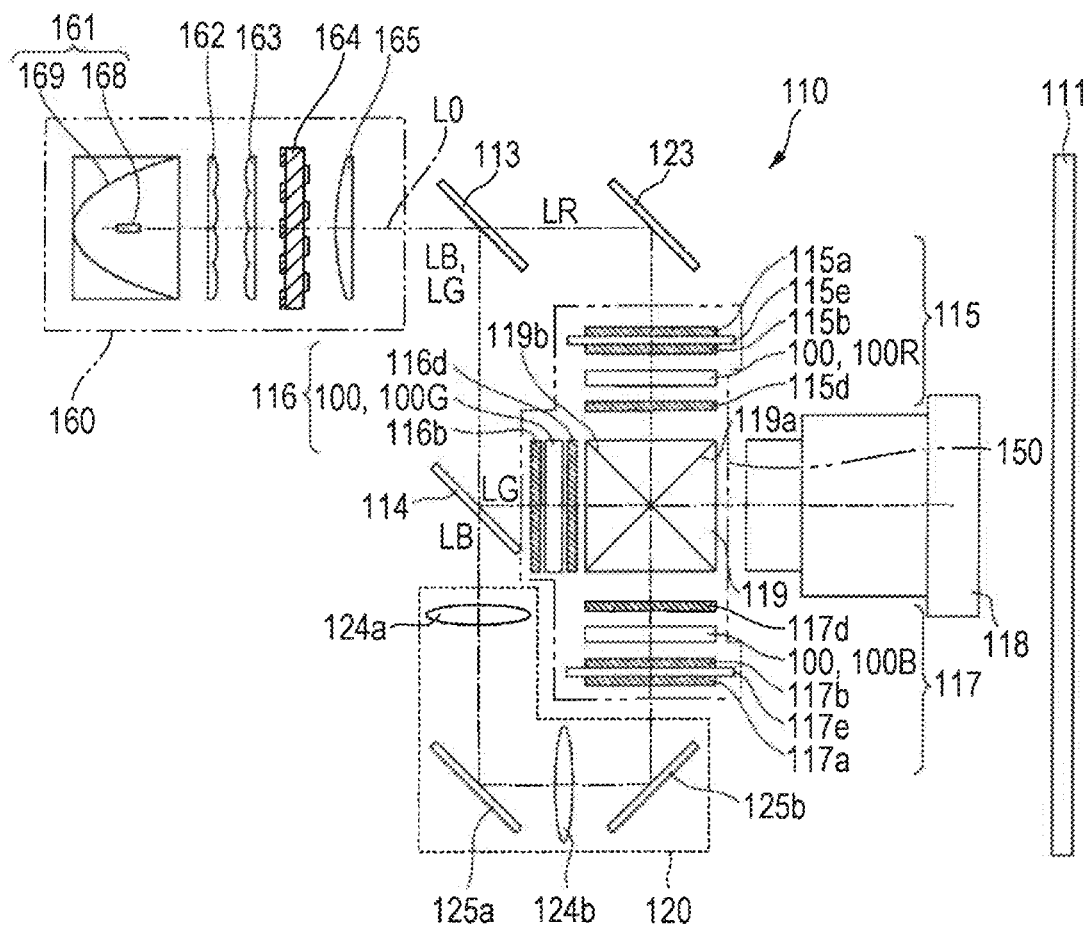
FIG. 15 is a schematic view of a projection display apparatus (electronic apparatus) including a liquid crystal device according to an embodiment of the invention.

FIG. 15 is a schematic view of a projection display apparatus (electronic apparatus) including a liquid crystal device 100 according to an embodiment of the invention. The electronic apparatus described below includes a plurality of liquid crystal devices 100 that receive light in different wavelength regions, and all the liquid crystal devices are according to an embodiment of the invention.

The projection display apparatus 110 shown in FIG. 15 is a liquid crystal projector including transmissive liquid crystal devices 100 and projects light onto a projection member 111, such as a screen, to display an image. The projection display apparatus 110 includes a lighting unit 160, a plurality of liquid crystal devices 100 (liquid crystal light valves 115 to 117) that receive light from the lighting unit 160, a cross dichroic prism 119 (photosynthesizing optical system) that synthesizes component lights coming from the display devices 100 and emits the synthesized light, and a projection optical system 118 that projects the light synthesized by the cross dichroic prism 119. These devices or components are disposed along the optical axis L0 of the apparatus. The projection display apparatus 110 also includes dichroic mirrors 113 and 114 and a relay system 120. In the projection display apparatus 110, the liquid crystal devices 100 and the cross dichroic prism 119 constitute an optical unit 150.

The lighting unit 160 includes a light source unit 161, a first integrator lens 162 defined by a lens array of, for example, fly-eye lenses, and a second integrator lens 163 defined by a lens array of, for example, fly-eye lenses, a polarization conversion element 164, and a condenser lens 165 that are arranged in this order along the optical axis L0 of the apparatus. The light source unit 161 includes a light source 168 that emits white light including a red component light LR, a green component light LG, and a blue component light LB, and a reflector 169. The light source 168 is an ultrahigh-pressure mercury-vapor lamp or the like, and the reflector 169 has a parabolic cross section. The first integrator lens 162 and the second integrator lens 163 uniformize the illumination distribution of the light emitted from the light source unit 161. The polarization conversion element 164 polarizes the light from the light source unit 161 into a polarized light, such as s-polarized light, having a specific direction of oscillation.

Dichroic mirror 113 transmits the red component light LR of white light emitted from the lighting unit 160 and reflects the green component light LG and the blue component light LB. Dichroic mirror 114 transmits the blue component light LB of the components reflected from the dichroic mirror 113 and reflects the green component light LG.

Thus, the dichroic mirrors 113 and 114 constitute a color separation optical system that separates the light emitted from the lighting unit 160 into the red component light LR, the green component light LG, and the blue component light LB.

Liquid crystal light valve 115 is a liquid crystal device that modulates the red component light LR transmitted through the dichroic mirror 113 and reflected from the reflection mirror 123 according to the image signal. Liquid crystal light valve 115 includes a λ/2 retardation plate 115a, a first polarizer 115b, a liquid crystal device 100 (red liquid crystal device 100R), and a second polarizer 115d. The red component light LR incident on the liquid crystal light valve 115 has been transmitted through the dichroic mirror 113 but has not been polarized, hence remaining s-polarized light.

The λ/2 retardation plate 115a is an optical element that converts the s-polarized light having entered the liquid crystal light valve 115 into p-polarized light. The first polarizer 115b blocks s-polarized light and transmits p-polarized light. The red liquid crystal device 100R is configured to convert p-polarized light into s-polarized light (for halftone, circularly polarized light or elliptically polarized light) by modulation according to the image signal.

The second polarizer 115b blocks p-polarized light and transmits s-polarized light. Accordingly, the liquid crystal light valve 115 modulates red component light LR according to the image signal and emits the modulated red component light LR to the cross dichroic prism 119. The λ/2 retardation plate 115a and the first polarizer 115b are arranged in contact with an optically transparent glass plate 115e that does not convert polarized light, thus being prevented from being warped by heat.

Liquid crystal light valve 116 is a liquid crystal device that modulates the green component light LG reflected from dichroic mirror 113 and further reflected from dichroic mirror 114 according to the image signal. As with liquid crystal light valve 115, liquid crystal light valve 116 includes a first polarizer 116b, a liquid crystal device 100 (green liquid crystal device 100G), and a second polarizer 116d. The green component light LG incident on liquid crystal light valve 116 is s-polarized light reflected from the dichroic mirrors 113 and 114. The first polarizer 116b blocks p-polarized light and transmits s-polarized light. The green liquid crystal device 100G is configured to convert s-polarized light into p-polarized light (for halftone, circularly polarized light or elliptically polarized light) by modulation according to the image signal. The second polarizer 116d blocks s-polarized light and transmits p-polarized light. Accordingly, the liquid crystal light valve 116 modulates green component light LG according to the image signal and emits the modulated green component light LG to the cross dichroic prism 119.

Liquid crystal light valve 117 is a liquid crystal device that modulates the blue component light LB reflected from dichroic mirror 113, transmitted through dichroic mirror 114, and having passed through the relay system 120 according to the image signal. As with liquid crystal light valves 115 and 116, liquid crystal light valve 117 includes a λ/2 retardation plate 117a, a first polarizer 117b, a liquid crystal device 100 (blue liquid crystal device 100B), and a second polarizer 117c. The blue component light LB incident on liquid crystal light valve 117 has been reflected from dichroic mirror 113, transmitted through dichroic mirror 114, and reflected from two reflection mirrors 125a and 125b of the relay system 120, thus being s-polarized light.

The λ/2 retardation plate 117a is an optical element that converts the s-polarized light having entered the liquid crystal light valve 117 into p-polarized light. The first polarizer 117b blocks s-polarized light and transmits p-polarized light. The blue liquid crystal device 100B is configured to convert p-polarized light into s-polarized light (for halftone, circularly polarized light or elliptically polarized light) by modulation according to the image signal. The second polarizer 117c blocks p-polarized light and transmits s-polarized light. Accordingly, the liquid crystal light valve 117 modulates blue component light LB according to the image signal and emits the modulated blue component light LB to the cross dichroic prism 119. The λ/2 retardation plate 117a and the first polarizer 117b are arranged in contact with a glass plate 117d.

The relay system includes relay lenses 124a and 124b and reflection mirrors 125a and 125b. Relay lenses 124a and 124b are intended to prevent optical loss resulting from the long optical path length of blue component light LB. Relay lens 124a is disposed between dichroic mirror 114 and reflection mirror 125a. Relay lens 124b is disposed between reflection mirrors 125a and 125b. Reflection mirror 125a reflects the blue component light LB that has passed through dichroic mirror 114 and the relay lens 124a to relay lens 124b. Reflection mirror 125b reflects the blue component light LB from relay lens 124b to light valve 117.

The cross dichroic prism 119 is a color synthesizing optical system defined by an X-shaped orthogonal arrangement of two dichroic films 119a and 119b. Dichroic film 119a reflects blue component light LB and transmits green component light LG; and dichroic film 119b reflects red component light LR and transmits green component light LG. Thus, the cross dichroic prism 119 synthesizes red component light LR, green component light LG, and blue component light LB, each modulated by the corresponding liquid crystal light valve 115 to 117 and emits the synthesized light to the projection optical system 118.

The light entering the cross dichroic prism 119 from liquid crystal light valves 115 and 117 is s-polarized light; and the light entering the cross dichroic prism 119 from liquid crystal light valve 116 is p-polarized light. Since the cross dichroic prism 119 receives different polarized lights, the lights coming from the liquid crystal light valves 115 to 117 can be synthesized in the cross dichroic prism 119. Dichroic films including the dichroic films 119a and 119b are generally reflective of s-polarized light. This is the reason why the red component light LR and blue component light LB reflected from the dichroic films 119a and 119b are s-polarized light while the green component light LG that passes through the dichroic films 119a and 119b is p-polarized light. The projection optical system 118, which includes a projection lens (not shown), projects light synthesized in the cross dichroic prism 119 onto a projection member ill, such as a screen.

Other Projection Display Apparatuses

The light source unit of the above-described projection display apparatus may have a structure using LED light sources emitting different color lights, and the lights emitted from the LED light sources are applied to their respective liquid crystal devices.

The liquid crystal device 100 according to an embodiment of the invention may be used in other electronic apparatuses, such as projection head-up displays (HUD), direct-view-type head-mounted displays (HMD), cellular phones, personal digital assistants (PDA), digital cameras, liquid crystal television sets, car navigation systems, and videophones, in addition to the above-described electronic apparatus.

The entire disclosure of Japanese Patent Application No. 2016-235639, filed Dec. 5, 2016 is expressly incorporated by reference herein.

What is claimed is:

1. A liquid crystal device comprising:
   a first substrate;
   a second substrate opposing the first substrate; and
   a liquid crystal layer between the first substrate and the second substrate,
   wherein the first substrate includes a first substrate body having a first surface opposing the second substrate and a second surface opposite the first surface, the first surface being provided with a first inorganic alignment layer and a first organic silane polymer layer that are formed in this order, the second surface being provided with a second organic silane polymer layer which is the same as the first organic silane polymer layer, a first adhesive layer, and a first light-transmitting plate that are formed in this order, and
   wherein a portion of the second organic silane polymer layer in contact with the first adhesive layer outside a display region is at least partially a first layer having a higher hydrophilicity than the second organic silane polymer layer of the display region.

2. The liquid crystal device according to claim 1, wherein the first layer has a molecular structure in which at least part of a hydrophobic functional group is removed.

3. The liquid crystal device according to claim 1, wherein the entirety of the portion of the second organic silane polymer layer outside the display region is the first layer.

4. The liquid crystal device according to claim 1, wherein at least two portions of the second organic silane polymer layer in contact with the first adhesive layer outside the display region, separated by the display region are the first layer.

5. The liquid crystal device according to claim 1,
wherein the second substrate includes a second substrate body having a third surface opposing the first substrate and a fourth surface opposite the third surface, the third surface being provided with a second inorganic alignment layer and a third organic silane polymer layer that are formed in this order, the fourth surface being provided with a fourth organic silane polymer layer which is the first organic silane polymer layer, a second adhesive layer, and a second light-transmitting plate that are formed in this order, and
wherein a portion of the fourth organic silane polymer layer in contact with the second adhesive layer outside the display region is at least partially a second layer having a higher hydrophilicity than the fourth organic silane polymer layer of the display region.

6. The liquid crystal device according to claim 1,
a frame-like sealing member surrounding the display region and disposed between the first substrate and the second substrate,
wherein a portion of the first organic silane polymer layer in contact with the sealing member is at least partially a third layer having a higher hydrophilicity than the first organic silane polymer layer of the display region.

7. An electronic apparatus comprising the liquid crystal device as set forth in claim 1.

8. An electronic apparatus comprising the liquid crystal device as set forth in claim 2.

9. An electronic apparatus comprising the liquid crystal device as set forth in claim 3.

10. The electronic apparatus according to claim 7, the electronic apparatus further comprising:
a light source unit that emits light to be applied to the liquid crystal device; and
a projection optical system that projects light modulated by the liquid crystal device,
wherein the light emitted from the light source unit is applied to the liquid crystal device through the first substrate.

11. A method for manufacturing a liquid crystal device including a first substrate, a second substrate opposing the first substrate, a frame-like sealing member surrounding a display region and bonding the first substrate and the second substrate together, and a liquid crystal layer between the first substrate and the second substrate, the method comprising:
forming a first inorganic alignment layer over a first surface of a first substrate body and then treating the first substrate body with a silane coupling agent, thereby simultaneously forming a first organic silane polymer layer at the first surface and a second organic silane polymer layer at a second surface opposite the first surface;
modifying at least a part of a portion of the second organic silane polymer layer outside the display region into a first layer having a higher hydrophilicity than the second organic silane polymer layer of the display region; and
bonding a first light-transmitting plate with a first adhesive layer in contact with a region including the first layer.

12. The method according to claim 11, wherein the modification into the first layer remove at least part of a hydrophobic functional group of the second organic silane polymer layer.

13. The method according to claim 11, wherein the modification into the first layer is performed by irradiating the first substrate body with UV light.

14. The method according to claim 13, wherein the modification into the first layer is performed by irradiating the first substrate body with UV light through a mask shielding the region corresponding to the display region.

15. The method according to claim 13, wherein the modification into the first layer is performed by irradiating the first substrate body with UV light from the first surface side.

16. The method according to claim 11, further comprising:
rinsing the first substrate body with an alcohol and drying the first substrate body to remove the alcohol therefrom, between the treatment of the first substrate with the silane coupling agent and the modification into the first layer.

17. The method according to claim 11, wherein the treatment of the first substrate body with the silane coupling agent and the modification into the first layer are performed on a mother substrate that is to be divided into a plurality of first substrates.

18. The method according to claim 11, further comprising:
forming an inorganic alignment layer over a third surface of a second substrate body and then treating the second substrate body with a silane coupling agent, thereby simultaneously forming a third organic silane polymer layer at the third surface and a fourth organic silane polymer layer at a fourth surface opposite the third surface;
modifying at least a part of a portion of the fourth organic silane polymer layer outside the display region into a second layer having a higher hydrophilicity than the fourth organic silane polymer layer of the display region; and
bonding a second light-transmitting plate with a second adhesive layer in contact with a region including the second layer.

* * * * *